(12) United States Patent
Yoshikawa et al.

(10) Patent No.: US 10,487,909 B2
(45) Date of Patent: *Nov. 26, 2019

(54) DAMPER DEVICE

(71) Applicants: AISIN AW INDUSTRIES CO., LTD, Echizen-shi, Fukui (JP); AISIN AW CO., LTD., Anjo-shi, Aichi (JP)

(72) Inventors: Takuya Yoshikawa, Echizen (JP); Aki Ogawa, Echizen (JP); Akiyoshi Kato, Echizen (JP); Ryosuke Otsuka, Echizen (JP); Kazuyoshi Ito, Anjo (JP); Masaki Wajima, Anjo (JP); Kazuhiro Itou, Anjo (JP)

(73) Assignees: AISIN AW INDUSTRIES CO., LTD, Echizen-shi (JP); AISIN AW CO., LTD., Anjo (JP)

( * ) Notice: Subject to any disclaimer, the term of this patent is extended or adjusted under 35 U.S.C. 154(b) by 94 days.

This patent is subject to a terminal disclaimer.

(21) Appl. No.: 15/735,045

(22) PCT Filed: Jun. 27, 2016

(86) PCT No.: PCT/JP2016/068995
§ 371 (c)(1),
(2) Date: Dec. 8, 2017

(87) PCT Pub. No.: WO2016/208763
PCT Pub. Date: Dec. 29, 2016

(65) Prior Publication Data
US 2018/0156307 A1    Jun. 7, 2018

(30) Foreign Application Priority Data

Jun. 26, 2015  (JP) .................................. 2015-129111
Mar. 31, 2016  (JP) .................................. 2016-072830

(51) Int. Cl.
*F16F 15/30*       (2006.01)
*F16F 15/134*      (2006.01)
(Continued)

(52) U.S. Cl.
CPC .............. *F16F 15/134* (2013.01); *F16F 7/10* (2013.01); *F16F 15/1206* (2013.01);
(Continued)

(58) Field of Classification Search
CPC .. F16H 41/24; F16H 45/02; F16H 2045/0231; F16H 2045/0268;
(Continued)

(56) References Cited

U.S. PATENT DOCUMENTS 4,382,393 A * 5/1983 Bowen ................. F16H 47/085
                                                     475/47
5,733,218 A * 3/1998 Sudau ................. F16F 15/1206
                                                    192/70.17
(Continued)

FOREIGN PATENT DOCUMENTS

CN     103221716 A      7/2013
DE     102014223872 A1  6/2015
(Continued)

OTHER PUBLICATIONS

Dec. 26, 2017 International Preliminary Report on Patentability issued in International Patent Application No. PCT/JP2016/068995.
(Continued)

*Primary Examiner* — Roger L Pang
(74) *Attorney, Agent, or Firm* — Oliff PLC

(57) ABSTRACT

Six through holes are formed in pinion gear supporting portions of two input plate members working as a carrier that supports pinion gears of a rotary inertia mass damper. The two input plate members are opposed to each other in such a manner that the through holes are aligned with each other.
(Continued)

The through holes support the pinion gear. The input plate members are coupled with each other by means of rivets passing through the through holes located on both sides of the through holes. This configuration ensures strength (rigidity) of the carrier, suppresses deformation of a planetary gear, and improves meshing accuracy of gears.

17 Claims, 14 Drawing Sheets

(51) Int. Cl.
*F16H 45/02* (2006.01)
*F16F 7/10* (2006.01)
*F16H 41/24* (2006.01)
*F16F 15/12* (2006.01)
*F16F 15/123* (2006.01)
*F16F 15/14* (2006.01)

(52) U.S. Cl.
CPC .... *F16F 15/12353* (2013.01); *F16F 15/1478* (2013.01); *F16F 15/30* (2013.01); *F16H 41/24* (2013.01); *F16H 45/02* (2013.01); F16H 2045/0226 (2013.01); F16H 2045/0231 (2013.01); F16H 2045/0268 (2013.01)

(58) Field of Classification Search
CPC ... F16H 2045/0226; F16F 15/134; F16F 7/10; F16F 15/30
USPC ............................................ 475/59, 47, 347
See application file for complete search history.

(56) References Cited

U.S. PATENT DOCUMENTS

| | | | |
|---|---|---|---|
| 6,126,568 A | 10/2000 | Sudau | |
| 6,231,472 B1* | 5/2001 | Sudau | F16H 45/02 |
| | | | 192/3.28 |
| 6,979,275 B2* | 12/2005 | Hiraku | F16H 3/54 |
| | | | 475/214 |
| 8,961,346 B2* | 2/2015 | Murakami | F16F 15/1478 |
| | | | 475/347 |
| 2012/0080281 A1 | 4/2012 | Takikawa et al. | |
| 2016/0208885 A1 | 7/2016 | Takikawa et al. | |
| 2017/0227087 A1* | 8/2017 | Dogel | F16F 15/13157 |
| 2017/0261065 A1* | 9/2017 | Yoshikawa | F16F 15/12366 |
| 2018/0149232 A1* | 5/2018 | Yoshikawa | F16F 15/31 |
| 2018/0187743 A1* | 7/2018 | Yoshikawa | F16H 45/02 |
| 2018/0245663 A1* | 8/2018 | Yoshikawa | F16F 15/1206 |
| 2018/0259034 A1* | 9/2018 | Takahashi | F16F 15/1206 |

FOREIGN PATENT DOCUMENTS

| | | |
|---|---|---|
| JP | H07-208546 A | 8/1995 |
| JP | 3299510 B2 | 7/2002 |
| JP | 2012-077826 A | 4/2012 |
| WO | 2015/056733 A1 | 4/2015 |

OTHER PUBLICATIONS

Jul. 26, 2016 International Search Report issued in International Patent Application No. PCT/JP2016/068995.

* cited by examiner

FIG. 4A1 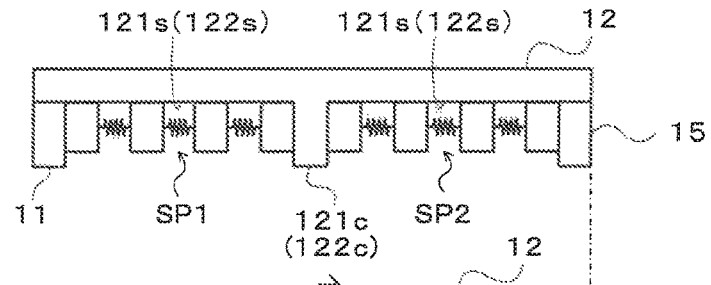
FIG. 4A2 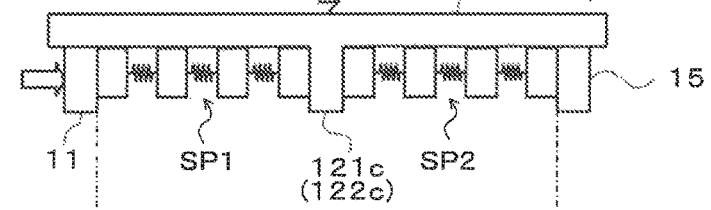
FIG. 4A3 
FIG. 4B1 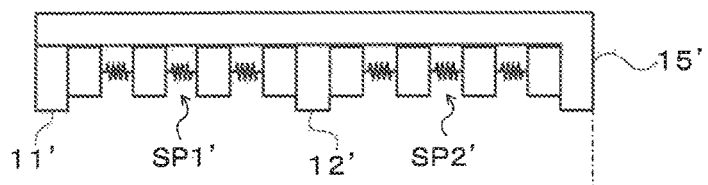
FIG. 4B2 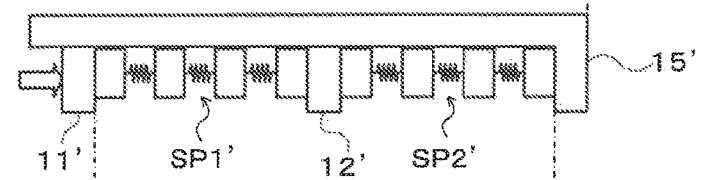
FIG. 4B3 

DAMPER DEVICE

This is a national phase application of PCT/JP2016/068995 filed Jun. 27, 2016, claiming priority to Japanese Patent Application No. JP2015-129111 filed Jun. 26, 2015 and No. JP2016-072830 filed Mar. 31, 2016, the contents of which are incorporated herein by reference.

TECHNICAL FIELD

The present disclosure relates to a damper device including a plurality of rotational elements which includes an input element and an output element, an elastic body configured to transmit a torque between the input element and the output element, and a rotary inertia mass damper with a mass body rotating in accordance with relative rotation between a plurality of rotational elements.

BACKGROUND

A conventionally known torque converter includes a lockup clutch, a torsional vibration damper, and a rotary inertia mass damper (power transmission mechanism) with a planetary gear (as shown in, for example, Patent Literature 1). In the torsional vibration damper of the torque converter has two cover plates (input element) are respectively coupled with a lockup piston by means of a plurality of bearing journals, a sun gear disposed between the two cover plates in an axial direction thereof such as to work as a driven-side transmission element (output element), and springs (elastic bodies) which transmit a torque between the cover plates and the sun gear. In addition to the sun gear, the rotary inertia mass damper further has a plurality of pinion gears (planet gears) rotatably supported by the cover plates as carrier via the bearing journals such as to mesh with the sun gear, and a ring gear that meshes with the plurality of pinion gears. In the above conventional torque converter, when the lockup clutch is engaged and the cover plates of the torsional vibration damper is rotated (twisted) relative to the sun gear, the springs are deflected and the ring gear as the mass body is rotated in accordance with relative rotation of the cover plates and the sun gear. This configuration causes an inertia torque according to a difference in angular acceleration between the cover plates and the sun gear to be applied to the sun gear as the output element of the torsional vibration damper from the ring gear as the mass body via pinion gears and improves the vibration damping performance of the torsional vibration damper.

CITATION LIST

Patent Literature

PTL1: Japanese Patent No. 3299510

SUMMARY

In the conventional torsional vibration damper, the springs that transmit the torque are pressed against the cover plates by a centrifugal force, so that a frictional force occurs between the springs and the cover plates. Therefore, a difference or a hysteresis occurs between a torque transmitted to the sun gear (output element) from the springs when an input torque to the cover plates (input element) increases and a torque transmitted to the sun gear from the springs when the input torque to the cover plates decreases. Further, in the rotary inertia mass damper of the above torque converter, the ring gear or the mass body is supported by the two cover plates or the carrier from both sides thereof, so that a difference in rotational speed (relative speed) between occurs between the ring gear and the cover plates. The difference in the rotational speed between the mass body and a support member of the mass body causes the difference or a hysteresis occurs between a torque transmitted to the sun gear (output element) from the rotary inertia mass damper when a relative displacement between the cover plates (input element) and the sun gear (output element) increases and a torque transmitted to the sun gear from the rotary inertia mass damper when the relative displacement between the cover plates and the sun gear decreases. Accordingly, it is necessary to take into account the hysteresis of both the torsional vibration damper and the rotary inertia damper such as to improve the vibration damping performance in the above conventional torque converter. However, the Patent Literature 1 does not take into account not only the hysteresis of the torsional vibration damper but also the hysteresis of the rotary inertia mass damper. Therefore, it is not easy to improve the vibration damping performance in the torque converter of the Patent Literature 1.

A subject matter of the disclosure is to improve vibration damping performance of the damper device with a rotary inertia mass damper.

The disclosure is directed to a damper device. The damper device is configured to include an input element to which a torque from an engine is transmitted, an output element, an intermediate element arranged to be connected to the input element and the output element, the intermediate element including elastic bodies, and a rotary inertia mass damper configured to include a planetary gear that includes a sun gear arranged to rotate integrally with one element of the input element and the output element, a carrier that rotatably supports a plurality of pinion gears and is arranged to rotate integrally with the other element of the input element and the output element, and a ring gear that meshes with the plurality of pinion gears and works as a mass body. The other element is configured to include two plate members that are opposed to each other and coupled with each other by means of a plurality of rivets disposed between the pinion gears.

In the damper device of this aspect, one element of the input element and the output element rotates integrally with the sun gear and the other element of the input element and the second element rotates integrally with the carrier that rotatably supports the plurality of pinion gears. The other element is configured to include two plate members that are opposed to each other and coupled with each other by means of a plurality of rivets disposed between the pinion gears. This configuration decreases an average torque to a shaft of the pinion gear. Further, strength (rigidity) of the carrier is ensured by coupling the two plate members with each other by means of the plurality of rivets and deformation of the planetary gear is suppressed such as to improve meshing accuracy of gears. As a result, an energy loss (hysteresis) caused by a gear meshing and the like is decreased.

BRIEF DESCRIPTION OF DRAWINGS

FIGS. 4A1, 4A2, 4A3, 4B1, 4B2 and 4B3 are a schematic view illustrating deflections and sliding distances of a first spring and a second spring and energy losses of an embodiment of the disclosure and a comparison example;

DESCRIPTION OF EMBODIMENTS

The following describes some embodiments of the disclosure with reference to drawings.

Figure 1:
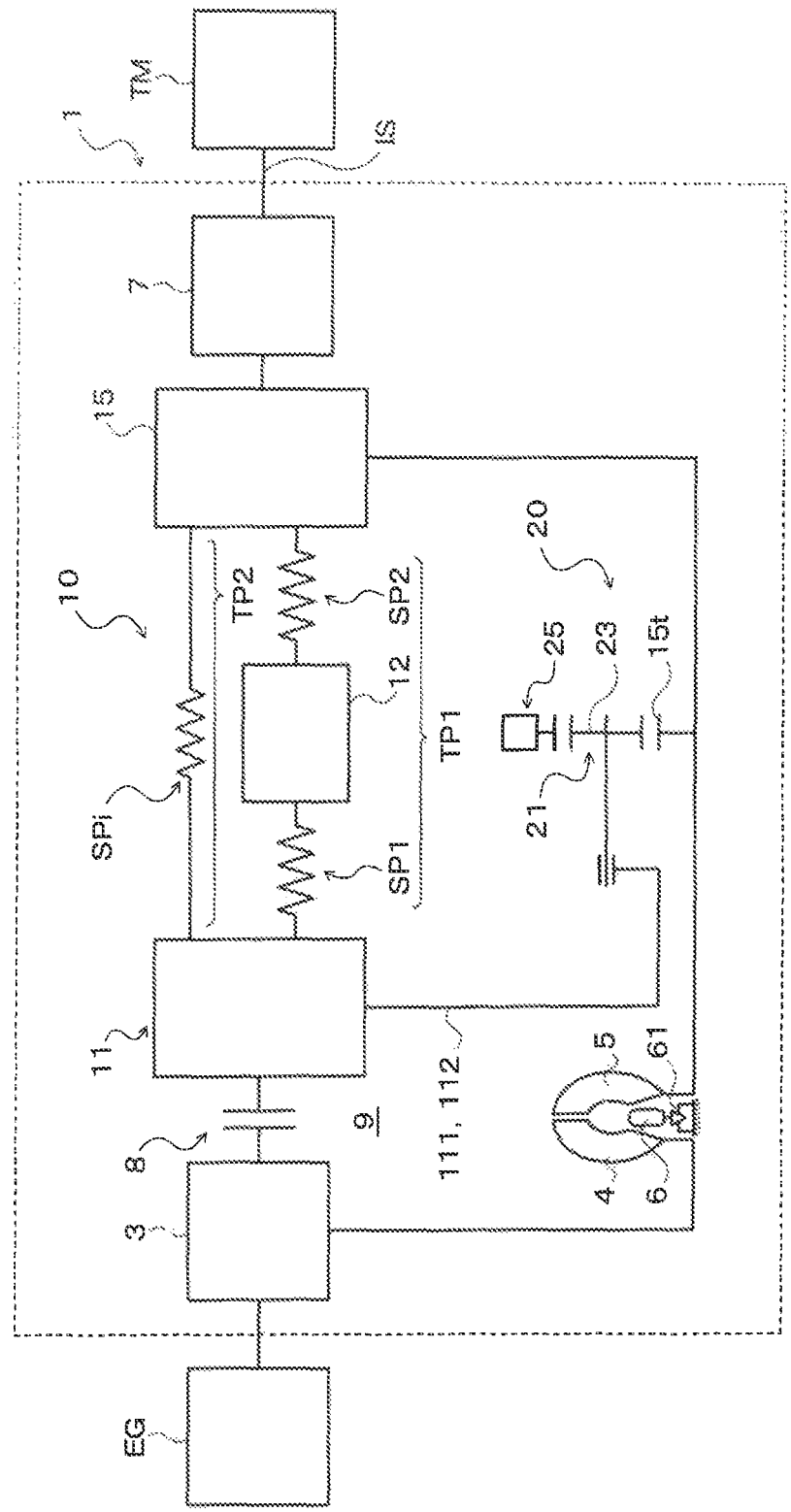
FIG. 1 is a schematic configuration diagram illustrating a starting device including a damper device according to the disclosure.
Figure 2:
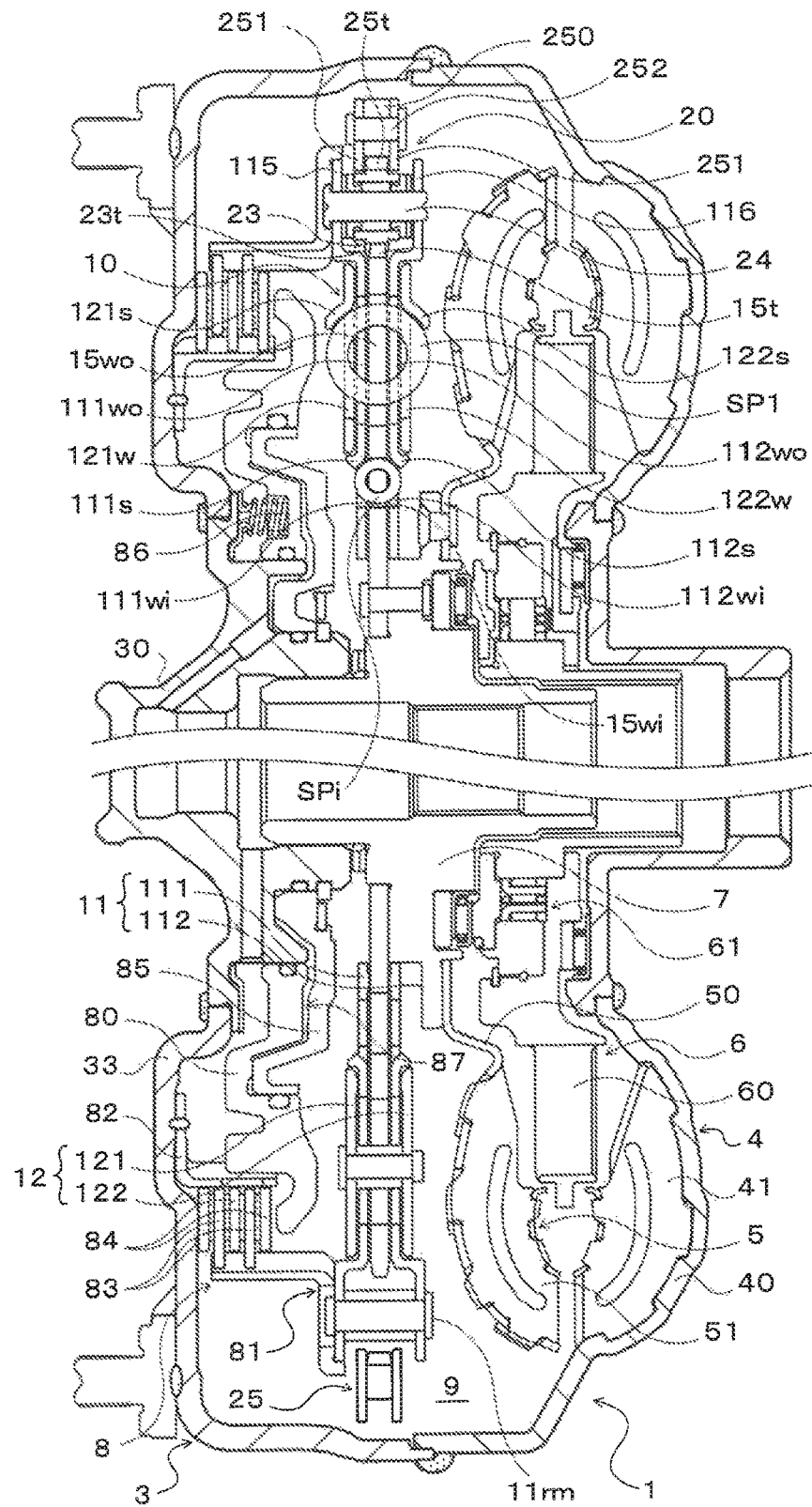
FIG. 2 is a sectional view illustrating the starting device of FIG. 1.

FIG. 1 is a schematic configuration diagram illustrating a starting device 1 including a damper device 10 according to the disclosure. FIG. 2 is a sectional view illustrating the starting device 1. The starting device 1 illustrated in these drawings is mounted on a vehicle equipped with an engine (internal combustion engine) EG as a driving source and may include, in addition to the damper device 10, for example, a front cover 3 serving as an input member connected with a crankshaft of the engine EG and configured to receive a torque transmitted from the engine EG, a pump impeller (input-side fluid transmission element) 4 fixed to the front cover 3, a turbine runner (output-side fluid transmission element) 5 arranged to be rotatable coaxially with the pump impeller 4, a damper hub 7 serving as an output member connected with the damper device 10 and fixed to an input shaft IS of a transmission TM that is either an automatic transmission (AT) or a continuously variable transmission (CVT), and a lockup clutch 8.

In the description below, a term "axial direction" basically means an extending direction of a central axis (axial center) of the starting device 1 or the damper device 10, unless otherwise specified. A term "radial direction" basically means a radial direction of the starting device 1, the damper device 10 or a rotational element of the damper device 10 and so on, i.e., an extending direction of a straight line extended in a direction perpendicular to the central axis (radial direction) from the central axis of the starting device 1 or the damper device 10, unless otherwise specified. Additionally, a term "circumferential direction" basically means a circumferential direction of the starting device 1, the damper device 10 or a rotational element of the damper device 10 and so on, i.e., a direction along a rotation direction of the rotational element, unless otherwise specified.

As shown in FIG. 2, the pump impeller 4 includes a pump shell 40 closely fixed to the front cover 3 to define a fluid chamber 9 in which hydraulic oil flows and a plurality of pump blades 41 provided on an inner surface of the pump shell 40. As shown in FIG. 2, the turbine runner 5 includes a turbine shell 50 and a plurality of turbine blades 51 provided on an inner surface of the turbine shell 50. An inner circumferential portion of the turbine shell 50 is fixed to the damper hub 7 by means of a plurality of rivets. The pump impeller 4 and the turbine runner 5 are opposed to each other, and a stator 6 is disposed coaxially between the pump impeller 4 and the turbine runner 5 to straighten the flow of hydraulic oil (hydraulic fluid) from the turbine runner 5 to the pump impeller 4. The stator 6 includes a plurality of stator blades 60. The rotation direction of the stator 6 is set to only one direction by a one-way clutch 61. The pump impeller 4, the turbine runner 5 and the stator 6 form a torus (annular flow path) to circulate the hydraulic oil and work as a torque converter (fluid transmission device) with the torque amplification function. In the starting device 1, however, the stator 6 and the one-way clutch 61 may be omitted, and the pump impeller 4 and the turbine runner 5 may work as fluid coupling.

The lockup clutch 8 is a hydraulic multi-plate clutch which executes and releases a lockup in which the front cover 3 and the damper hub 7 are coupled to each other via the damper device 10. The lockup clutch 8 includes a lockup piston 80 slidably supported in the axial direction by a center piece 30 which is fixed to the front cover 3, a clutch drum 81, an annular clutch hub 82 fixed to an inner surface of a side wall portion 33 of the front cover 3 to oppose to the lockup piston 80, a plurality of first friction engagement plates (friction plates with a friction material on both surfaces) 83 engaged to splines formed on an inner periphery of the clutch drum 81, and a plurality of second friction engagement plates 84 (separator plates) engaged to splines formed on an outer periphery of the clutch hub 82.

Further, the lockup clutch 8 includes an annular flange member (oil chamber defining member) 85 attached to the center piece 30 of the front cover 3 to be disposed on the side opposite to the front cover 3 with respect to the lockup piston 80, that is, disposed on the side of the turbine runner 5 and the damper device 10 with respect to the lockup piston 80, and a plurality of return springs 86 disposed between the front cover 3 and the lockup piston 80. As illustrated in the drawing, the lockup piston 80 and the flange member 85 define an engagement oil chamber 87. Hydraulic oil (engagement hydraulic pressure) is supplied to the engagement oil chamber 87 from a hydraulic control device (not illustrated). Increasing the engagement hydraulic pressure for the engagement oil chamber 87 moves the lockup piston 80 in the axial direction such that the first and the second friction engagement plates 83 and 84 are pressed toward the front cover 3, which brings the lockup clutch 8 into engagement (complete engagement or slip engagement). A hydraulic single-plate clutch that includes a lockup piston to which a friction material is affixed may be adopted as the lockup clutch 8.

As shown in FIGS. 1 and 2, the damper device 10 includes a drive member (input element) 11, an intermediate member (intermediate element) 12 and a driven member (output element) 15, as rotational elements. The damper device 10 also includes a plurality of (for example, three in this embodiment) first springs (first elastic bodies) SP1 arranged to transmit the toque between the drive member 11 and the intermediate member 12, a plurality of (for example, three in this embodiment) second springs (second elastic bodies) SP2 arranged to respectively work in series with the corresponding first inner springs SP1 and to transmit the torque between the intermediate member 12 and the driven member 15, and a plurality of (for example, three in this embodiment) inner springs SPi arranged to transmit the torque between the drive member 11 and the driven member 15, as torque transmission elements (torque transmission elastic bodies).

As shown in FIG. 1, the damper device 10 has a first torque transmission path TP1 and a second torque transmission path TP2 that are provided parallel to each other between the drive member 11 and the driven member 15. The first torque transmission path TP1 is configured by the plurality of first springs SP1, the intermediate member 12 and the plurality of second springs SP2 such as to transmit the torque between the drive member 11 and the driven member 15 via these elements. According to this embodiment, coil springs having an identical specification (spring constant) are employed for the first and the second inner springs SP1 and SP2 of the first torque transmission path TP1.

The second torque transmission path TP2 is configured by the plurality of inner springs SPi such as to transmit the torque between the drive member 11 and the driven member 15 via the plurality of inner springs SPi that work parallel to one another. According to this embodiment, the plurality of inner springs SPi of the second torque transmission path TP2 are configured to work in parallel to the first and the second springs SP1 and SP2 of the first torque transmission path TP1, after an input torque into the drive member 11 reaches a predetermined torque (first threshold value) T1 that is smaller than a torque T2 (second threshold value) corresponding to a maximum torsion angle θmax of the damper device 10 and a torsion angle of the drive member 11 relative to the driven member 15 becomes equal to or larger than a predetermined angle θref. The damper device 10 accordingly has two-step (two-stage) damping characteristics.

According to this embodiment, a linear coil spring made of a metal material that is spirally wound to have an axial center extended linearly at no load is employed for the first and the second springs SP1 and SP2 and the inner springs SPi. Compared with employing an arc coil spring, this more appropriately expands and contracts the first and the second springs SP1 and SP2 and the inner springs SPi along their axial centers and reduces a difference between a torque transmitted to the driven member 15 from the second springs SP2 and the like when a relative displacement between the drive member 11 and the driven member 15 increases and a torque transmitted to the driven member 15 from the second springs SP2 and the like when the relative displacement between the drive member 11 and the driven member 15 decreases, that is a hysteresis. The arc coil spring may, however, be employed for at least any of the first and the second springs SP1 and SP2 and the inner springs SPi.

As shown in FIG. 2, the drive member 11 of the damper device 10 includes an annular first input plate member 111 that is coupled with the clutch drum 81 of the lockup clutch 8, and an annular second input plate members 112 that is coupled with the first input plate member 111 by means of a plurality of rivets 11rm such as to be opposed with the first input plate member 111. Accordingly, the drive member 11, or the first and the second input plate member 111 and 112 rotate integrally with the clutch drum 81. Further, the front cover 3 (engine EG) is coupled with the drive member 11 of the damper device 10 by engagement of the lockup clutch 8.

Figure 3:
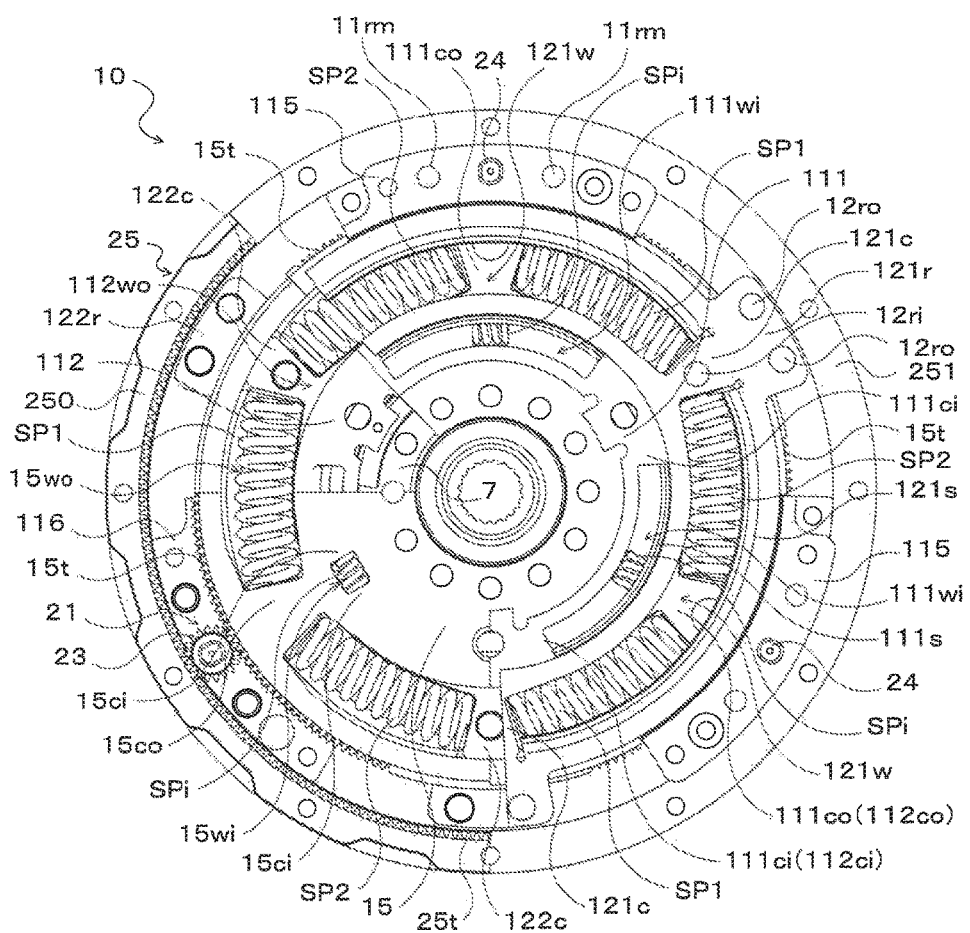
FIG. 3 is a front view illustrating the damper device according to the disclosure.

As shown in FIGS. 2 and 3, the first input plate member 111 is configured to include a plurality of (for example, three in this embodiment) arc-shaped outer spring-accommodating windows 111wo arranged at intervals (at equal intervals) in the circumferential direction, a plurality of (for example, three in this embodiment) arc-shaped inner spring-accommodating windows 111wi arranged on an inner side in the radial direction of each outer spring-accommodating window 111wo at intervals (at equal intervals) in the circumferential direction, a plurality of (for example, three in this embodiment) spring support portions ills respectively extending along an outer circumferential edge of each inner spring-accommodating window 111wi, a plurality of (for example, three in this embodiment) outer spring contact portions 111co, and a plurality of (for example, six in this embodiment) inner spring contact portions 111ci. The inner spring-accommodating windows 111wi respectively have a circumferential length longer than a natural length of the inner spring SPi (see FIG. 3). One outer spring contact portion 111co is disposed between the outer spring-accommodating windows 111wo arranged adjacent to each other in the circumferential direction. One inner spring contact portion 111ci is disposed on each side in the circumferential direction of each inner spring-accommodating window 111wi.

The second input plate member 112 is configured to include a plurality of (for example, three in this embodiment) arc-shaped outer spring-accommodating windows 112wo arranged at intervals (at equal intervals) in the circumferential direction, a plurality of (for example, three in this embodiment) arc-shaped inner spring-accommodating windows 112wi arranged on an inner side in the radial direction of each outer spring-accommodating window 112wo at intervals (at equal intervals) in the circumferential direction, a plurality of (for example, three in this embodiment) spring support portions 112s respectively extending along an outer circumferential edge of each inner spring-accommodating window 112wi, a plurality of (for example, three in this embodiment) outer spring contact portions 112co, and a plurality of (for example, six in this embodiment) inner spring contact portions 112ci. The inner spring-accommodating windows 112wi respectively have a circumferential length longer than the natural length of the inner spring SPi (see FIG. 3). One outer spring contact portion 112co is disposed between the outer spring-accommodating windows 112wo arranged adjacent to each other in the circumferential direction. One inner spring contact portion 112ci is disposed on each side in the circumferential direction of each inner spring-accommodating window 112wi. In this embodiment, the first and the second input plate members 111 and 112 have an identical shape such as to reduce the number of kinds of parts.

As shown in FIGS. 2 and 3, the intermediate member 12 includes a first intermediate plate member 121 that is disposed on the front cover 3-side of the first input plate member 111 of the drive member 11, and a second intermediate plate member 122 that is disposed on the turbine runner 5-side of the second input plate member 112 of the drive member 11 and coupled with the first intermediate plate member 121 by means of a plurality of rivets. As shown in FIG. 2, the first and the second input plate members 111 and 112 are disposed between the first intermediate plate member 121 and the second intermediate plate member 122 in the axial direction of the damper device 10.

As shown in FIGS. 2 and 3, the first intermediate plate member 121 is configured to include a plurality of (for example, three in this embodiment) arc-shaped spring-accommodating windows 121w arranged at intervals (at equal intervals) in the circumferential direction, a plurality of (for example, three in this embodiment) spring support portions 121s respectively extending along an outer circumferential edge of the corresponding spring-accommodating window 121w, and a plurality of (for example, three in this embodiment) spring contact portions 121c. One spring contact portion 121c is disposed between the spring-accommodating windows 121w arranged adjacent to each other in the circumferential direction. The second intermediate plate member 122 is configured to include a plurality of (for example, three in this embodiment) arc-shaped spring-accommodating windows 122w arranged at intervals (at equal intervals) in the circumferential direction, a plurality of (for example, three in this embodiment) spring support portions 122s respectively extending along an outer circumferential edge of the corresponding spring-accommodating window 122w, and a plurality of (for example, three in this embodiment) spring contact portions 122c. One spring contact portion 122c is disposed between the spring-accommodating windows 122w arranged adjacent to each other in the circumferential direction. As shown in FIG. 2, the spring supporting portions 121s and 122s are formed in such a manner that inner circumference portions axially extend in an arc-shaped manner along the first and the second springs SP1 and SP2. This enables the first and second springs SP1 and SP2 to be smoothly supported from the outer circumference side.

FIGS. 4A1, 4A2, 4A3, 4B1, 4B2 and 4B3 are a schematic view illustrating deflections and sliding distances d of the first and the second springs SP1 and SP2 and energy losses of this embodiment and a comparison example. FIGS. 4A1, 4A2 and 4A3 correspond to this embodiment where the first and the second springs SP1 and SP2 are supported by the intermediate member 12 from an outer circumference side. FIGS. 4B1, 4B2 and 4B3 correspond to the comparison example where first and second springs SP1' and SP2' are supported by a driven member (output element) 15' from the outer circumference side. FIGS. 4A1 and 4B1 illustrate a normal state where a relative displacement (torsion) of the drive member 11, 11' to the driven member 15, 15' is not generated. FIGS. 4A2 and 4B2 illustrate a state where the relative displacement (torsion) of the drive member 11, 11' to the driven member 15, 15' is generated. FIGS. 4A3 and 4B3 illustrate sliding distances d of the first and the second springs SP1, SP1', SP2 and SP2' with respect to sliding surfaces in the outer circumference side when the relative displacement (torsion) of the drive member 11, 11' to the driven member 15, 15' is generated. In FIGS. 4A1, 4A2, 4B1 and 4B2, each of the first and the second springs SP1, SP1', SP2 and SP2' is schematically illustrated as a combination of a plurality of mass bodies and a plurality of springs. In this embodiment, as shown in FIG. 4A1, the first and second springs SP1 and SP2 are supported by the spring supporting portions 121s and 122s from the outer circumference side. When the relative displacement (torsion) of the drive member 11 to the driven member 15 is generated, as shown in FIG. 4A2, the relative displacement contracts the first spring SP1. A spring force of the contracted first spring SP1 generates a relative displacement of the intermediate member 12 to the driven member 15. The relative displacement of the intermediate member 12 contracts the second spring SP2. On this occasion, the sliding distances d of the first and the second springs SP1 and SP2 with respect to the outer sliding surfaces that are the spring supporting portions 121s and 122s become larger at a farther position from the contact portion 121c and 122c of the intermediate member 12 (center in FIGS. 4A1 and 4A2), as shown in FIG. 4A3. On the other hand, the first and second springs SP1 and SP2 are supported by the driven member 15' (output element) from the outer circumference side in the comparison example, as shown in FIG. 4B1. When the relative displacement (torsion) of the drive member 11' to the driven member 15' is generated, as shown in FIG. 4B2, the relative displacement contracts the first spring SP1'. A spring force of the contracted first spring SP1' generates a relative displacement of the intermediate member 12' to the driven member 15'. The relative displacement of the intermediate member 12' contracts the second spring SP2'. On this occasion, the sliding distances d of the first and the second springs SP1' and SP2' with respect to the outer sliding surfaces that are included in the driven member 15' become larger at a farther position from the outer contact portion 15co of the driven member 15' (right end portion in FIGS. 4B1 and 4B2), as shown in FIG. 4B3. As seen from FIGS. 4A3 and 4B3, the sliding distance d of the second spring SP2 of this embodiment is equal to that of the second spring SP2' of the comparison example. On the other hand, the sliding distance d at any positions of the first spring SP1 of this embodiment is larger than that of the first spring SP1' of the comparison example by the sliding distance d of the second spring SP2' at the left end portion of the figure. An energy loss is obtained by multiplying frictional forces of the first and second spring SP1 and SP2 and the sliding distances d. Therefore, this embodiment where the first and second springs SP1 and SP2 are supported by the spring supporting portions 121s and 122s from the outer circumference side enables the energy loss (energy loss or hysteresis caused by the sliding) to be decreased, compared with the configuration where the first and second springs SP1 and SP2 are supported by the driven member 15 (output element) or the drive member 11 (input member) from the outer circumference side. This enables a phase delay in the torque transmission path to be decreased, thereby improving the vibration damping performance of the damper device 10. As with the comparison example, similar results appear in a configuration where the first and second springs SP1' and SP2' are supported by the drive member 11' (input element) from the outer circumference side (not shown).

In this embodiment, the driven member 15 and the first and the second input plates 111 and 112 are disposed between the first and the second intermediate plates 121 and 122. This facilitates setting an inertia, compared with a configuration including one intermediate plate. In this embodiment, the first and the second intermediate plate members 121 and 122 have an identical shape such as to reduce the number of kinds of parts.

The driven member 15 is a plate-like annular member that is disposed between the first and the second input plate members 111 and 112 in the axial direction and fixed to the damper hub 7 by means of a plurality of rivets. As shown in FIGS. 2 and 3, the driven member 15 is configured to include a plurality of (for example, three in this embodiment) arc-shaped outer spring-accommodating windows 15wo arranged at intervals (at equal intervals) in the circumferential direction, a plurality of (for example, three in this embodiment) arc-shaped inner spring-accommodating windows 15wi arranged on an inner side in the radial direction of each outer spring-accommodating window 15wo at intervals (at equal intervals) in the circumferential direction, a plurality of (for example, three in this embodiment) outer spring contact portions 15co, and a plurality of (for example, six in this embodiment) inner spring contact portions 15ci. One outer spring contact portion 15co is disposed between the outer spring-accommodating windows 15wo arranged adjacent to each other in the circumferential direction. The inner spring-accommodating windows 15wi respectively have a circumferential length longer than the natural length of the inner spring SPi. One inner spring contact portion 15ci is disposed on each side in the circumferential direction of each inner spring-accommodating window 15wi.

One first spring SP1 and one second spring SP2 are disposed in the outer spring-accommodating windows 111wo and 112wo of the first and the second input plate members 111 and 112 and outer spring-accommodating windows 15wo of the driven member 15, such that the first and the second springs SP1 and SP2 form a pair (to act in series). In the mounting state of the damper device 10, the outer spring contact portions 111co and 112co of the first and the second input plate members 111 and 112 and the outer spring contact portions 15co of the driven member 15 are respectively disposed between the first and the second springs SP1 and SP2 that are disposed in the different outer spring-accommodating windows 15wo, 111wo and 112wo not to form a pair (not to act in series), and come into contact with ends of the first and the second springs SP1 and SP2.

The spring contact portions 121c and 122c of the first and the second intermediate plate members 121 and 122 are respectively disposed between the common outer spring-accommodating windows 15wo, 111wo and 112wo to form a pair, and come into contact with ends of the first and the second springs SP1 and SP2. The first and the second springs SP1 and SP2 disposed in the different outer spring-accommodating windows 15wo, 111wo and 112wo not to form a pair (not to act in series) are disposed in the spring-accommodating windows 121w and 122w of the first and second intermediate plate members 121 and 122. The first and the second springs SP1 and SP2 that do not form a pair (not to act in series) are supported (guided) from the outer side in the radial direction by the spring support portion 121s of the first intermediate plate member 121 on the front cover 3-side and the spring support portion 122s of the second intermediate plate member 122 on the turbine runner 5-side.

As shown in FIG. 3, the first and the second springs SP1 and SP2 are thus alternately arranged in the circumferential direction of the damper device 10. One end of each first spring SP1 comes into contact with the corresponding outer spring contact portions 111co and 112co of the drive member 11, and the other end of each first spring SP1 comes into contact with the corresponding spring contact portions 121c and 122c of the intermediate member 12. One end of each second spring SP2 comes into contact with the corresponding spring contact portions 121c and 122c of the intermediate member 12, and the other end of each second spring SP2 comes into contact with the corresponding outer spring contact portion 15co of the driven member 15.

As a result, the first and the second springs SP1 and SP2 forming a pair are connected with each other in series via the spring contact portions 121c and 122c of the intermediate member 12 between the drive member 11 and the driven member 15. Accordingly, the damper device 10 further reduces the rigidity of the elastic bodies configured to transmit the torque between the drive member 11 and the driven member 15 or more specifically a combined spring constant of the first and the second springs SP1 and SP2. In this embodiment, as shown in FIG. 3, the plurality of first springs SP1 and the plurality of second springs SP2 are arranged on an identical circumference, such that the distance between the axial center of the starting device 1 or the damper device 10 and the axial center of each first inner spring SP1 is equal to the distance between the axial center of the starting device 1 and so on and the axial center of each second inner spring SP2.

The inner spring SPi is disposed in each of the inner spring-accommodating windows 15wi of the driven member 15. In the mounting state of the damper device 10, each of the inner spring contact portions 15ci comes into contact with a corresponding end of the inner spring SPi. In the mounting state of the damper device 10, a side of the each inner spring SPi on the front cover 3-side is located in a circumferential center of the corresponding inner spring-accommodating window 111wi of the first input plate member 111 and supported (guided) from the outer side in the radial direction by the spring support portion 111s of the first input plate member 111. In the mounting state of the damper device 10, a side of the each inner spring SPi on the turbine runner 5-side is located in a circumferential center of the corresponding inner spring-accommodating window 112wi of the second input plate member 112 and supported (guided) from the outer side in the radial direction by the spring support portion 112s of the second input plate member 112.

As shown in FIGS. 2 and 3, each of the inner springs SPi is arranged in an inner circumferential-side region in the fluid chamber 9 such as to be surrounded by the first and the second springs SP1 and SP2. This configuration further shortens the axial length of the damper device 10 and thereby the axial length of the starting device 1. Each of the inner springs SPi comes into contact with one pair of the inner spring contact portions 111ci and 112ci disposed on the respective sides of the spring support portions 111wi and 112wi of the first and second input plate members 111 and 112 when the input torque (drive torque) into the drive member 11 or the torque applied from the axle side to the driven member 15 (driven torque) reaches the above torque T1.

The damper device 10 further includes a stopper (not shown) configured to restrict the relative rotation of the drive member 11 to the driven member 15. In this embodiment, the stopper includes a plurality of stopper portions arranged at intervals in the circumferential direction such as to protrude in the radial direction toward the damper hub 7 from an inner circumferential portion of the second input plate member 112, and a plurality of arc-shaped cut-out portions formed at intervals in the circumferential direction in the damper hub 7 to which the driven member 15 is fixed. In the mounting state of the damper device 10, each of the stopper portions of the second input plate member 112 is disposed in the corresponding cut-out portion of the damper hub 7 such as not to come into contact with wall surfaces of the damper hub 7, the wall surfaces defining both ends of the cut-out portion. When each of the stopper portions of the second input plate member 112 comes into contact with one of the wall surfaces defining both ends of the cut-out portion of the damper hub 7 accompanied with relative rotation of the drive member 11 to the driven member 15, the stopper restricts the relative rotation of the drive member 11 to the driven member 15 and the deflections of all of the t springs SP1, SP2 and SPi.

Additionally, as shown in FIG. 1, the damper device 10 includes a rotary inertia mass damper 20 that is arranged parallel to both the first torque transmission path TP1 that includes the plurality of first springs SP1, the intermediate member 12 and the plurality of second springs SP2 and the second torque transmission path TP2 that includes the plurality of inner springs SPi. In this embodiment, the rotary inertia mass damper 20 is configured to include a single pinion-type planetary gear 21 disposed between the drive member 11 or the input element of the damper device 10 and the driven member 15 or the output element of the damper device 10.

The planetary gear 21 is configured by the driven member 15 that includes outer teeth 15t in an outer circumference thereof such as to work as a sun gear, the first and the second input plate members 111 and 112 that rotatably support a plurality (for example, three in this embodiment) of pinion gears 23 respectively engaging with the outer teeth 15t such as to work as a carrier, and a ring gear 25 that is disposed concentrically with the driven member 15 (outer teeth 15t) or the sun gear and has inner teeth 25t engaging with the each pinion gear 23. Accordingly, in the fluid chamber 9, the driven member 15 or the sun gear, the plurality of pinion gears 23 and the ring gear 25 at least partially overlap with the first and second springs SP1 and SP2 (and inner springs SPi) in the axial direction as viewed in the radial direction of the damper device 10.

As shown in FIGS. 2 and 3, the outer teeth 15t are formed on a plurality of predetermined portions of an outer circumferential surface of the driven member 15 at intervals (at equal intervals) in the circumferential direction. The outer teeth 15t are located radially outside the outer spring-accommodating window 15wo and the inner spring-accommodating window 15wi, that is, the first spring SP1, the second spring SP2 and the inner spring SPi that transmit the torque between the drive member 11 and the driven member 15. The outer teeth 15t may be formed on the entire outer circumference of the driven member 15.

As shown in FIGS. 2 and 3, the first input plate member 111 forming the carrier of the planetary gear 21 is configured to include a plurality of (for example, three in this embodiment) pinion gear supporting portions 115 disposed radially outside the outer spring contact portions 111co at intervals (at equal intervals) in the circumferential direction. Similarly, the second input plate member 112 forming the carrier of the planetary gear 21 is configured to include a plurality of (for example, three in this embodiment) pinion gear supporting portions 116 disposed radially outside the outer spring contact portions 112co at intervals (at equal intervals) in the circumferential direction, as shown in FIGS. 2 and 3.

Figure 5:
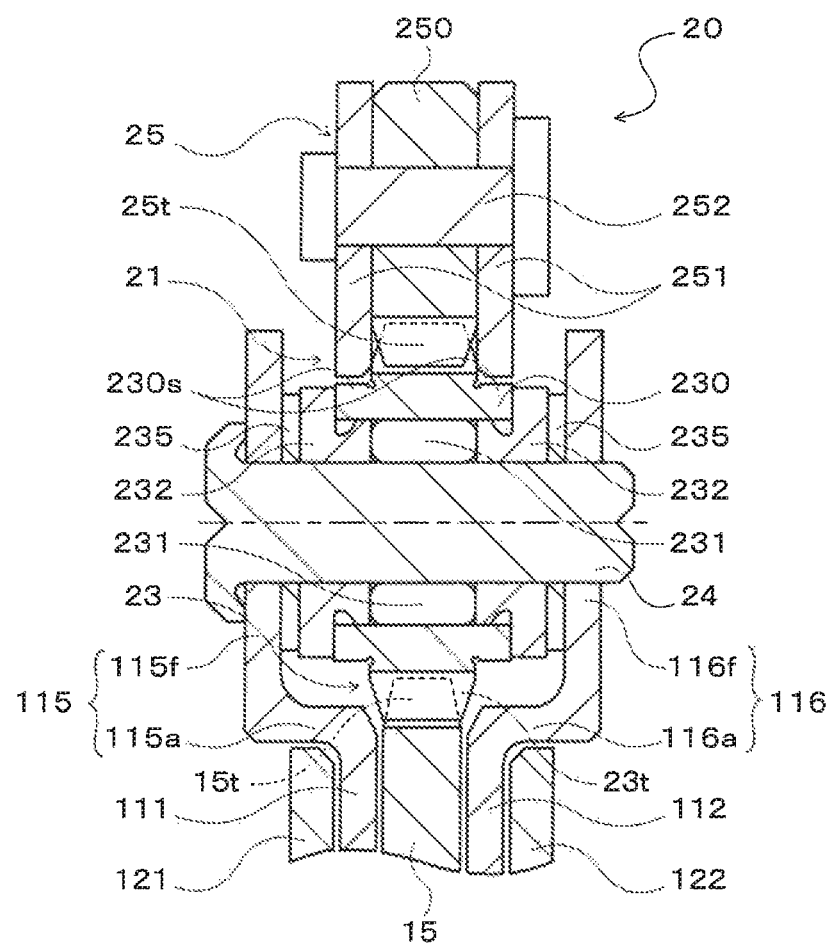
FIG. 5 is an enlarged sectional view illustrating a rotary inertia mass damper of the damper device according to the disclosure.

As shown in FIG. 5, each of the pinion gear supporting portions 115 of the first input plate member 111 is configured to include an arc-shaped axially extending portion 115a configured to axially protrude toward the front cover 3 and an arc-shaped flanged portion 115f radially extended outward from an end of the axially extending portion 115a. Each of the pinion gear supporting portions 116 of the second input plate member 112 is configured to include an arc-shaped axially extending portion 116a configured to axially protrude toward the turbine runner 5 and an arc-shaped flanged portion 116f radially extended outward from an end of the axially extending portion 116a. Each of the pinion gear supporting portions 115 (flanged portion 115f) is opposed to the corresponding pinion gear supporting portions 116 (flanged portion 116f) in the axial direction. The flanged portion 115f and 116f forming a pair respectively support an end of a pinion shaft 24 inserted into the pinion gear 23. In this embodiment, the pinion gear supporting portions 115 (flanged portions 115f) are fixed to the clutch drum 81 of the lockup clutch 8 by means of rivets. Further, in this embodiment, the first intermediate plate member 121 of the intermediate member 12 is aligned by an inner circumferential surface of the axially extending portion 115a of the pinion gear supporting portion 115. The second intermediate plate member 122 of the intermediate member 12 is aligned by an inner circumferential surface of the axially extending portion 116a of the pinion gear supporting portion 116.

As shown in FIG. 5, the pinion gears 23 of the planetary gear 21 are configured to include an annular gear body 230 having gear teeth (outer teeth) 23t in an outer circumference thereof, a plurality of needle bearings 231 disposed between an inner circumferential surface of the gear body 230 and an outer circumferential surface of the pinion shaft 24, a pair of spacers 232 engaged to both ends of the gear body 230 such as to restricts an axial motion of the needle bearing 231. As shown in FIG. 5, the gear body 230 of the pinion gear 23 includes annular radially supporting portions 230s that respectively protrude outside an axial end of the gear teeth 23t in an inner side of bottoms of the gear teeth 23t in the radial direction of the pinion gear 23 and have a cylindrical outer circumferential surface. A diameter of an outer circumferential surface of each spacer 232 is identical to or smaller diameter than that of the radially supporting portion 230s.

The plurality of pinion gears 23 are supported at intervals (at equal intervals) in the circumferential direction by the first and the second input plate members 111 and 112 (pinion gear supporting portions 115 and 116) or the carrier. A washer 235 is disposed between a side face of each spacer 235 and the pinion gear supporting portion 115 or 116 (flanged portion 115f or 116f) of the first or the second input plate member 111 or 112. As shown in FIG. 5, an axial gap is defined between both side faces of the gear teeth 23t of the pinion gear 23 and the pinion gear supporting portion 115 or 116 (flanged portion 115f or 116f) of the first or the second input plate member 111 or 112.

The ring gear 25 of the planetary gear 21 configured to include an annular gear body 250 having inner teeth 25t in an inner circumference thereof, two annular-shaped side plates 251, a plurality of rivets 252 for fixing the each side plate 251 to both axial side face of the gear body 250. The gear body 250, the two side plates 251 and the plurality of rivets 252 are integrated each other and work as a mass body of the rotary inertia mass damper 20. In this embodiment, the inner teeth 25t is formed on the entire inner circumference of the gear body 250. The inner teeth 25t may be formed on a plurality of predetermined portions of the inner circumferential surface of the gear body 250 at intervals (at equal intervals) in the circumferential direction. As shown in FIG. 3, recessed portions may be formed on an outer circumferential surface of the gear body 250 such as to adjust a weight of the ring gear 25.

Each of the side plates 251 has a concave cylindrically shaped inner circumferential surface and works as a supported portion that is axially supported by the plurality of pinion gears 23 engaging with the inner teeth 25t. That is, in both axial ends of the inner teeth 25t, the two side plates 251 are respectively fixed to the corresponding side face of the gear body 250 such as to protrude inside bottoms of the inner teeth 25t in the radial direction and oppose to at least the side face of the gear teeth 23t of the pinion gear 23. As shown in FIG. 5, in this embodiment, the inner circumferential surface of each side plate 251 is located slightly inside tips of the inner teeth 25t.

When each of the pinion gears 23 meshes with the inner teeth 25t, the inner circumferential surface of each side plate 251 is supported by the corresponding radially supporting portion 230s of the pinion gear 23 (gear body 230). This enables the ring gear 25 to be accurately aligned with respect to the axial center of the driven member 15 or the sun gear by the radially supporting portions 230s of the plurality of pinion gears 23 and to smoothly rotate (oscillate). Further, when each of the pinion gears 23 meshes with the inner teeth 25t, an inner face of each side plate 251 opposes to the side face of the gear teeth 23t of the pinion gear 23 and a side face of a portion from the bottoms of the gear teeth 23t to the radially supporting portion 230s. Accordingly, an axial motion of the ring gear 25 is restricted by at least the side face of the gear teeth 23t of the pinion gear 23. Further, as shown in FIG. 5, an axial gap is defined between an outer face of each side plate 251 of the ring gear 25 and the pinion gear supporting portion 115 or 116 (flanged portion 115f or 116f) of the first or the second input plate member 111 or 112.

Figure 6:
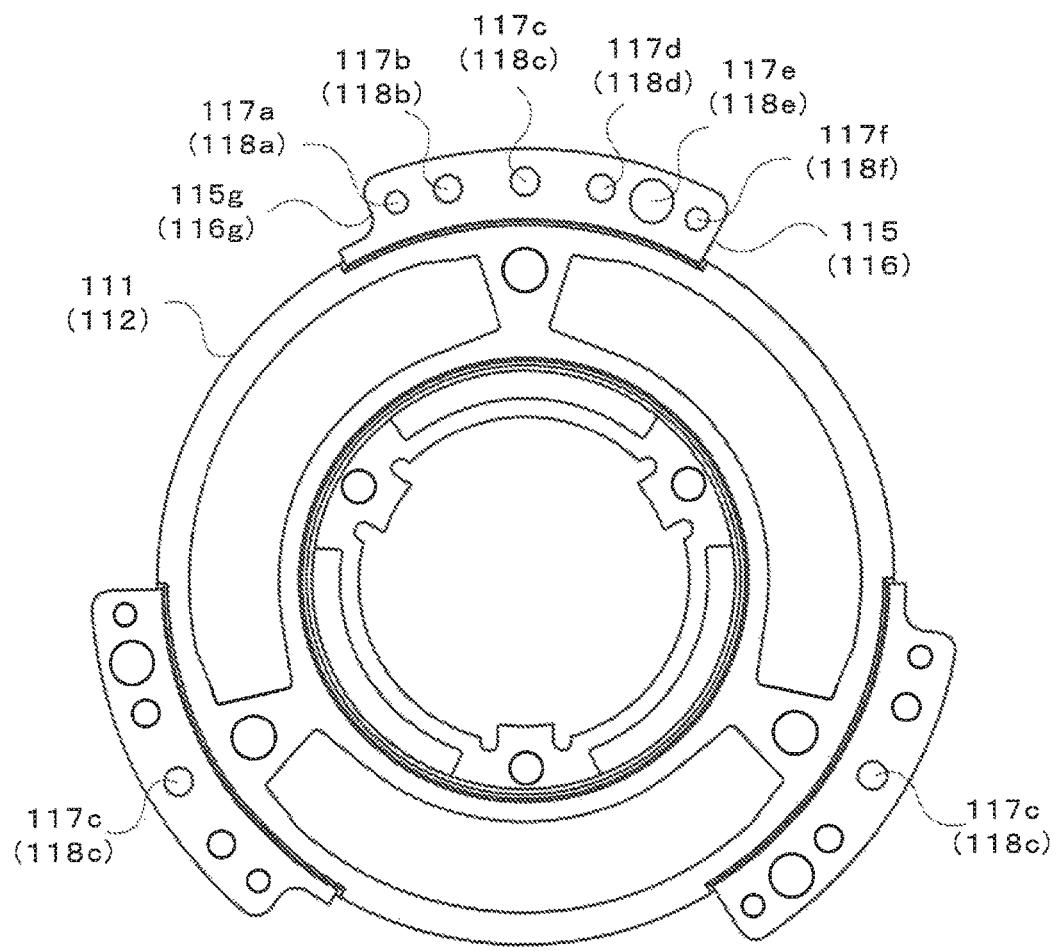
FIG. 6 is a front view illustrating one of two input plate members of a drive member.
Figure 7:
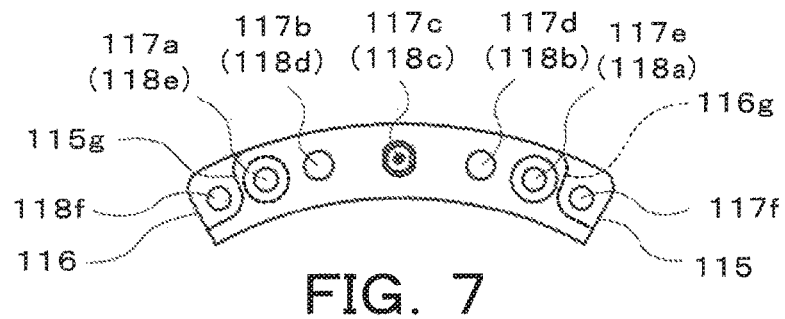
FIG. 7 is an explanatory view illustrating pinion gear supporting portions.

FIG. 6 is a front view illustrating one of two input plate members 111 and 112 of the drive member 11. As shown in the figure, the first and the second input plate members 111 and 112 have an identical shape. Six through holes 117a-117f and six through holes 118a-118f are formed on a same circumference of the plurality of (for example, each for three in this embodiment) pinion gear supporting portions 115 and 116 as viewed in the central axis of the damper device 10. Curved cut-out portion 115g and 116g are formed at ends located on the side of the through holes 117a and 118a of the pinion gear supporting portions 115 and 116 such as to avoid one through hole. FIG. 7 illustrates the pinion gear supporting portions 115 and 116 when the second input plate member 112 shown in FIG. 6 is turned inside-out and opposed to the first input plate member 111 in such a manner that the through hole 117c is aligned with the through hole 118c. As shown in the figure, by aligning the through hole 117c with the through hole 118c, the through holes 117a-117e are aligned with the through holes 118e-118a but the through holes 117f and 118f are not aligned with other holes. In this embodiment, the pinion shaft 24 inserted in the pinion gear 23 is supported by the through holes 117c and 118c and the first and the second input plates 111 and 112 are coupled with each other by the plurality of rivets 11rm passing through the through holes 117b, 118d and 117d, 118b located on both sides of the through holes 117c and 118c through which the pinion shaft 24 is inserted. The first and the second input plates 111 and 112 or the carrier that supports the pinion gears 23 of the rotary inertia mass damper 20 are coupled with each other by the plurality of rivets 11rm, so that strength (rigidity) of the carrier is ensured and deformation of the planetary gear is suppressed such as to improve meshing accuracy of gears. As a result, an energy loss (hysteresis) caused by a gear meshing and the like is decreased. Further, the first and the second input plates 111 and 112 are coupled with each other by the plurality of rivets 11rm passing through the through holes 117b, 118d and 117d, 118b located on both sides of the pinion shaft 24 and on the same circumference as viewed in the central axis. This configuration enables a radial offset between the pinion shaft 24 and the rivets 11rm to be decreased upon a torque transmission, such as to avoid an occurrence of undesired moments. Accordingly, strength (rigidity) of the carrier is ensured and deformation of the planetary gear is suppressed such as to improve meshing accuracy of gears. As a result, an energy loss (hysteresis) caused by a gear meshing and the like is decreased.

Figure 8:
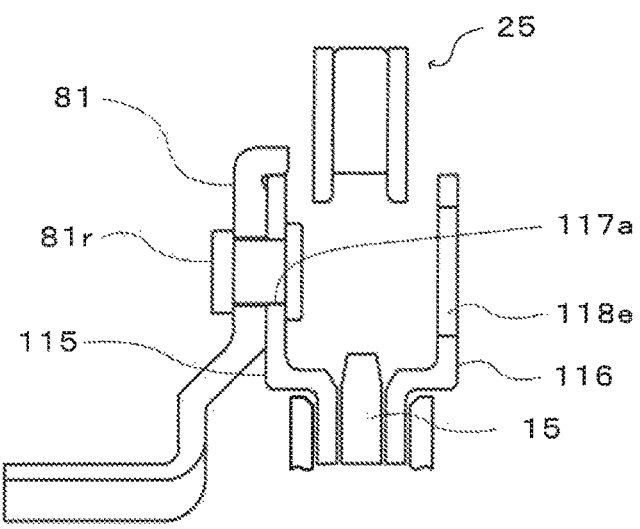
FIG. 8 is a partially enlarged sectional view illustrating a state where a clutch drum is fastened to the pinion gear supporting portion by means of a rivet passing through a through hole.

The clutch drum 81 of the lockup clutch 8 is coupled with the pinion gear supporting portion 115 of the first input plate member 111 by means of rivets 81r passing through the through holes 117a and 117f. FIG. 8 illustrates a state where the clutch drum 81 is fastened to the pinion gear supporting portion 115 by means of a rivet 81r passing through the through hole 117a. The through hole 118e of the pinion gear supporting portion 116 exists behind the through hole 117a as viewed from the clutch drum 81. On the other hand, as shown in FIG. 7, the curved cut-out portion 115g is formed in the pinion gear supporting portion 115 such as to be adjacent to the through hole 117a (left side of the through hole 117a in FIG. 7). Therefore, the rivet 81r passing through the through hole 117a is easily caulked by a tool such as to fasten the clutch drum 81. In this embodiment, the rivet 81r passes through the through hole 117f such as to fasten the clutch drum 81. Nothing exists behind the through hole 117f (back side of FIG. 7) by forming the curved cut-out portion 116g on the pinion gear supporting portion 116. Accordingly, the rivet 81r passing through the through hole 117f is easily caulked by the tool.

Figure 9:
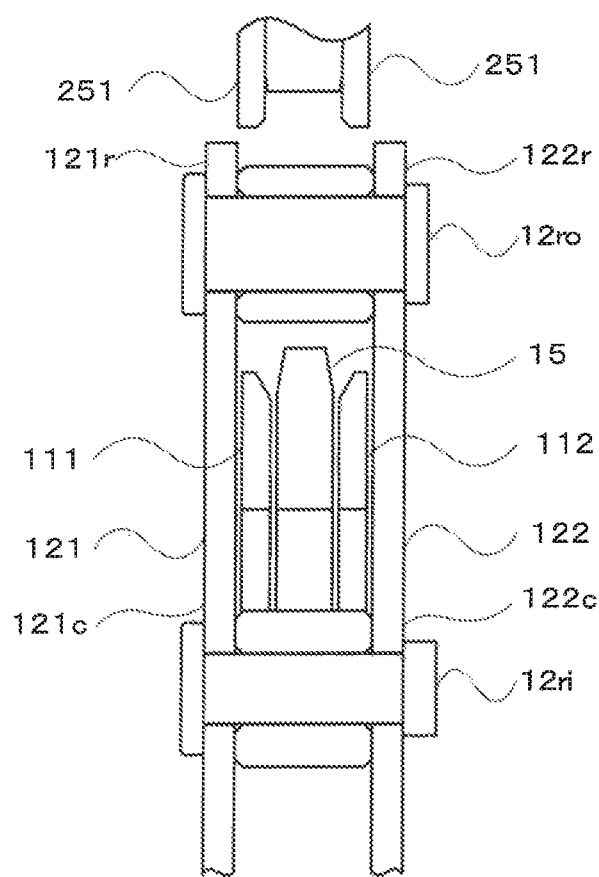
FIG. 9 is an explanatory view illustrating a cross section of a portion where the first and the second intermediate plate members are coupled with each other by means of a plurality of rivets.

FIG. 9 is an explanatory view illustrating a cross section of a portion (right upper portion in FIG. 3) where the first and the second intermediate plate members 121 and 122 are coupled with each other by means of a plurality of rivets 12ro and 12ri. As shown in FIGS. 3 and 9, the first and the second intermediate plates 121 and 122 are respectively provided with three connecting portions 121r or 122r that respectively extend outward between three pinion gears 23 in the circumferential direction. The first and the second intermediate plates 121 and 122 are coupled with each other at two positions of the connecting portions 121r and 122r on the same circumference as the pinion gears 23 by two rivets 12ro (total six rivets at three connecting portions 121r and 122r) and at a center of the contact portions 121c and 122c by one rivet 12ri. Such an arrangement of two rivets 12ro and the rivet 12ri ensures spaces for the first spring SP1, the second spring SP2 and the inner spring SPi and improves the vibration damping performance of the damper device 10. In this embodiment, the rivet 12ri is disposed at the center of the contact portions 121c and 122c such as to couple the first and the second intermediate plates 121 and 122. However, the rivet 12ri of the contact portions 121c and 122c may be a small rivet and may be omitted from the contact portions 121c and 122c.

When the lockup by the lockup clutch 8 is released in the starting device 1 with the configuration described above, as seen from FIG. 1, the torque (power) transmitted from the engine EG to the front cover 3 is transmitted to the input shaft IS of the transmission TM via the path of the pump impeller 4, the turbine runner 5, the driven member 15 and the damper hub 7. When the lockup is executed by the lockup clutch 8 of the starting device 1, on the other hand, the torque transmitted from the engine EG to the drive member 11 via the front cover 3 and the lockup clutch 8 is transmitted to the driven member 15 and the damper hub 7 via the first torque transmission path TP1 including the plurality of first springs SP1, the intermediate member 12 and the plurality of second springs SP2, and the rotary inertia mass damper 20 until the input torque reaches the above torque T1. When the input torque becomes equal to or higher than the above torque T1, the torque transmitted to the drive member 11 is transmitted to the driven member 15 and the damper hub 7 via the first torque transmission path TP1, the second torque transmission path TP2 including the plurality of inner springs SPi, and the rotary inertia mass damper 20.

When the drive member 11 is rotated (twisted) relative to the driven member 15 under an execution of the lockup (engagement of the lockup clutch 8), the first and the second springs SP1 and SP2 are deflected, and the ring gear 25 or the mass body is rotated (oscillated) about the axial center in accordance with relative rotation of the drive member 11 to the driven member 15. More specifically, when the drive member 11 is rotated (oscillated) relative to the driven member 15, the rotation speed of the drive member 11 (first and the second input plate members 111 and 112) or the carrier which is an input element of the planetary gear 21 becomes higher than the rotation speed of the driven member 15 or the sun gear. In such a state, the rotation speed of the ring gear 25 is increased by the action of the planetary gear 21, so that the ring gear 25 is rotated at a higher rotation speed than the rotation speed of the drive member 11. This causes an inertia torque to be applied from the ring gear 25 that is the mass body of the rotary inertia mass damper 20 to the driven member 15 that is the output element of the damper device 10 via the pinion gears 23 and thereby damps the vibration of the driven member 15.

The following describes a design procedure of the damper device 10.

As described above, in the damper device 10, until the input torque transmitted to the drive member 11 reaches the above torque T1, the first and the second springs SP1 and SP2 included in the first torque transmission path TP1 work in parallel to the rotary inertia mass damper 20. When the first and the second springs SP1 and SP2 work in parallel to the rotary inertia mass damper 20, the torque transmitted from the first torque transmission path TP1 including the intermediate member 12 and the first and the second springs SP1 and SP2 to the driven member 15 depends on (is proportional to) the displacement (amount of deflection or torsion angle) of the second springs SP2 between the intermediate member 12 and the driven member 15. The torque transmitted from the rotary inertia mass damper 20 to the driven member 15, on the other hand, depends on (is proportional to) a difference in angular acceleration between the drive member 11 and the driven member 15, i.e., a second order differential equation result of the displacement of the first and the second springs SP1 and SP2 between the drive member 11 and the driven member 15. On the assumption that the input torque transmitted to the drive member 11 of the damper device 10 is periodically vibrated as shown by Equation (1) given below, the phase of the vibration transmitted from the drive member 11 to the driven member 15 via the first torque transmission path TP1 is accordingly shifted by 180 degrees from the phase of the vibration transmitted from the drive member 11 to the driven member 15 via the rotary inertia mass damper 20.

[Math. 1]

$$T = T_0 \sin \omega t \quad (1)$$

Additionally, in the damper device 10 including the single intermediate member 12, two resonances occur in the first torque transmission path TP1 when the deflections of the first and the second springs SP1 and SP2 are allowed and the inner springs SPi are not deflected. That is, a resonance (first resonance) of the entire damper device 10 occurs in the first torque transmission path TP1 by the vibrations of the drive member 11 and the driven member 15 in the opposite phases when the deflections of the first and the second springs SP1, SP2 are allowed and the inner springs SPi are not deflected. A resonance (second resonance) also occurs in the first torque transmission path TP1 by the vibrations of the intermediate member 12 in the opposite phase to both the drive member 11 and the driven member 15 when the deflections of the first and the second springs SP1, SP2 are allowed and the inner springs SPi are not deflected, at a higher rotation speed side (higher frequency side) than the first resonance.

In order to further improve the vibration damping effect of the damper device 10 with the above characteristics, as the result of intensive studies and analyses, the inventors have noted that the damper device 10 can damp the vibration of the driven member 15 by making the amplitude of the vibration of the first torque transmission path TP1 equal to the amplitude of the vibration of the rotary inertia mass damper 20 in the opposite phase. The inventors have established an equation of motion as shown by Equation (2) given below in a vibration system including the damper device 10 in which the torque is transmitted from the engine EG to the drive member 11 under engagement of the lockup clutch and the inner springs SPi are not deflected. In Equation (2), "$J_1$" denotes a moment of inertia of the drive member 11, "$J_2$" denotes a moment of inertia of the intermediate member 12 as described above, "$J_3$" denotes a moment of inertia of the driven member 15, and "$J_i$" denotes a moment of inertia of the ring gear 25 that is the mass body of the rotary inertia mass damper 20. Further, "$\theta_1$" denotes a torsion angle of the drive member 11, "$\theta_2$" denotes a torsion angle of the intermediate member 12, "$\theta_3$" denotes a torsion angle of the driven member 15. Furthermore, "k1" denotes a combined spring constant of the plurality of first springs SP1 working in parallel between the drive member 11 and the intermediate member 12, "k2" denotes a combined spring constant of the plurality of second springs SP2 working in parallel between the intermediate member 12 and the driven member 15. Additionally, "$\lambda$" denotes a gear ratio of the planetary gear 21 (a pitch circle diameter of the outer teeth 15t (sun gear)/a pitch circle diameter of the inner teeth 25t of the ring gear 25) included in the rotary inertia mass damper 20, that is, a ratio of a rotational speed of the ring gear 25 or the mass body with respect to a rotational speed of the driven member 15, and "T" denotes an input torque transmitted to the drive member from the engine EG.

[Math. 2]

$$\begin{bmatrix} J_1 + J_i \cdot (1+\lambda)^2 & 0 & -J_i \cdot \lambda \cdot (1+\lambda) \\ 0 & J_2 & 0 \\ -J_i \cdot \lambda \cdot (1+\lambda) & 0 & J_3 + J_i \cdot \lambda^2 \end{bmatrix} \begin{bmatrix} \ddot{\theta}_1 \\ \ddot{\theta}_2 \\ \ddot{\theta}_3 \end{bmatrix} + \\ \begin{bmatrix} k_1 & -k_1 & 0 \\ -k_1 & k_1+k_2 & -k_2 \\ 0 & -k_2 & k_2 \end{bmatrix} \begin{bmatrix} \theta_1 \\ \theta_2 \\ \theta_3 \end{bmatrix} = \begin{bmatrix} T_1 \\ 0 \\ 0 \end{bmatrix} \quad (2)$$

Additionally, the inventors have assumed that the input torque T is periodically vibrated as shown by Equation (1) given above and have also assumed that the torsion angle $\theta_1$ of the drive member 11, the torsion angle $\theta_2$ of the intermediate member 12 and the torsion angle $\theta_3$ of the driven member 15 are periodically responded (vibrated) as shown by Equation (3) given below. In Equations (1) and (3), "$\omega$" denotes an angular frequency in the periodical fluctuation (vibration) of the input torque T. In Equation (3), "$\Theta_1$"

denotes an amplitude of the vibration (vibration amplitude, i.e., maximum torsion angle) of the drive member 11 generated during transmission of the torque from the engine EG, "$\Theta_2$" denotes an amplitude of vibration (vibration amplitude) of the intermediate member 12 generated during transmission of the torque from the engine EG to the drive member 11, and "$\Theta_3$" denotes an amplitude of vibration (vibration amplitude) of the driven member 15 generated during transmission of the torque from the engine EG to the drive member 11. On such assumptions, an identity of Equation (4) given below is obtained by substituting Equations (1) and (3) into Equation (2) and eliminating "sin ωt" from both sides.

[Math. 3]

$$\begin{bmatrix} \theta_1 \\ \theta_2 \\ \theta_3 \end{bmatrix} = \begin{bmatrix} \Theta_1 \\ \Theta_2 \\ \Theta_3 \end{bmatrix} \sin \omega t \quad (3)$$

$$\begin{bmatrix} T_1 \\ 0 \\ 0 \end{bmatrix} = \begin{bmatrix} k_1 - \omega^2\{J_1 + J_i \cdot (1+\lambda)^2\} & -k_1 & \omega^2 \cdot J_i \cdot \lambda \cdot (1+\lambda) \\ -k_1 & k_1 + k_2 - \omega^2 \cdot J_2 & -k_2 \\ \omega^2 \cdot J_i \cdot \lambda \cdot (1+\lambda) & -k_2 & k_2 - \omega^2(J_3 + J_i \cdot \lambda^2) \end{bmatrix} \begin{bmatrix} \Theta_1 \\ \Theta_2 \\ \Theta_3 \end{bmatrix} \quad (4)$$

In Equation (4), when the vibration amplitude $\Theta_3$ of the driven member 15 is zero, this means that the vibration from the engine EG is theoretically damped completely by the damper device 10 and that no vibration is theoretically transmitted to the transmission TM, the driveshaft and the like located downstream of the driven member 15. From this point of view, the inventors have obtained a conditional expression of Equation (5) by solving the identity of Equation (4) with respect to the vibration amplitude $\Theta_3$ and setting $\Theta_3=0$. Equation (5) is a quadratic equation with regard to the square of angular frequency $\omega^2$ in the periodical fluctuation of the input torque T. When the square of angular frequency $\omega^2$ is either of two real roots (or multiple root) of Equation (5), the vibration from the engine EG transmitted from the drive member 11 to the driven member 15 via the first torque transmission path TP1 and the vibration transmitted from the drive member 11 to the driven member 15 via the rotary inertia mass damper 20 are cancelled out each other, and the vibration amplitude $\Theta_3$ of the driven member 15 theoretically becomes equal to zero.

[Math. 4]

$$J_2 \cdot J_i \cdot \lambda(1+\lambda) \cdot (\omega^2)^2 - J_i \cdot \lambda(1+\lambda) \cdot (k_1+k_2) \cdot \omega^2 + k_1 \cdot k_2 = 0 \quad (5)$$

Figure 10:
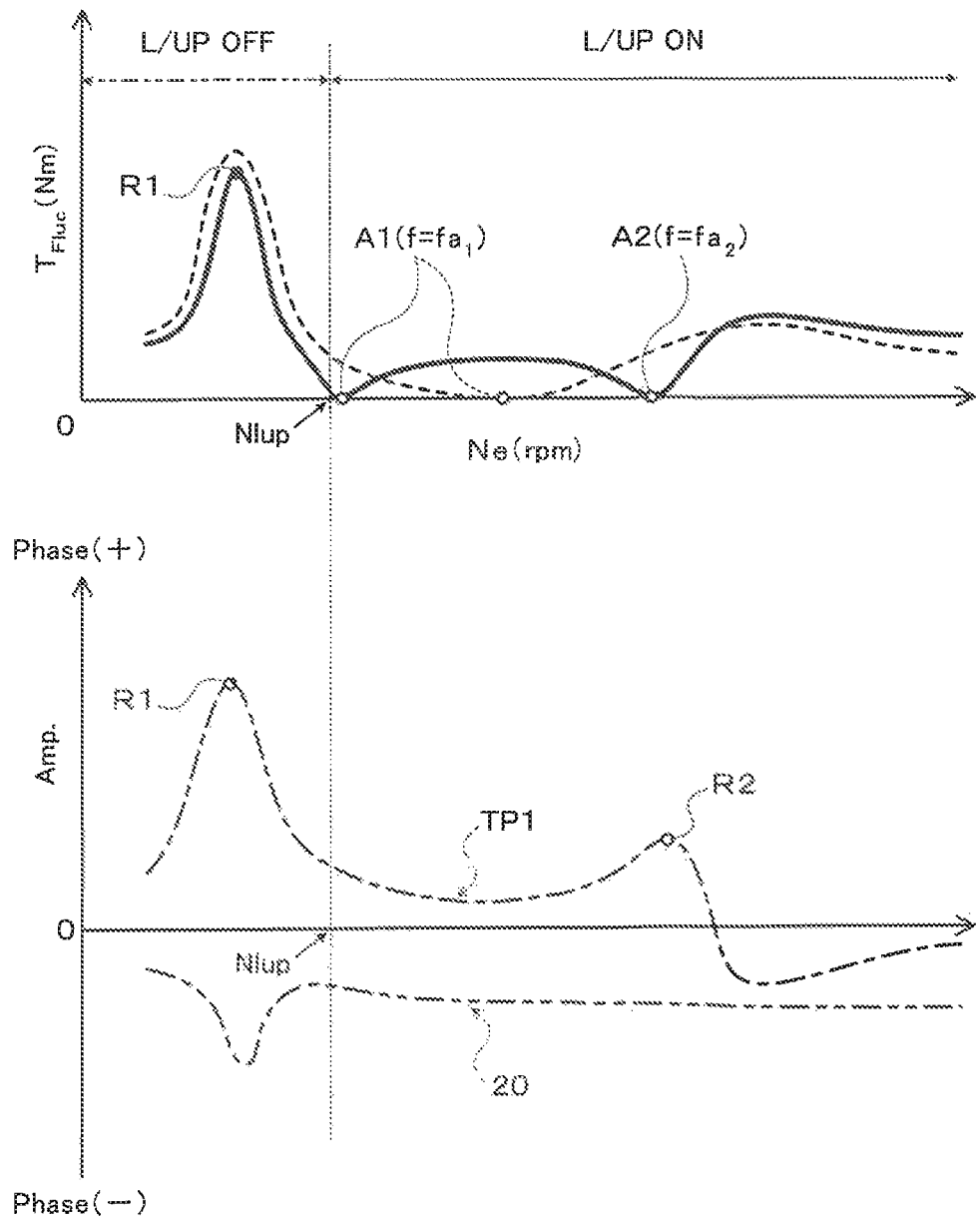
FIG. 10 is a diagram illustrating a relationship of rotation speed of an engine to torque variation $T_{Fluc}$ at an output element in the damper device according to the disclosure.

This result of analysis indicates that a total of two antiresonance points (A1 and A2 in FIG. 10) providing theoretically zero vibration amplitude $\Theta_3$ of the driven member 15 may be set in the damper device 10 that includes the intermediate member 12 and accordingly provides two peaks, i.e., a resonance in the torque transmitted via the first torque transmission path TP1 as shown in FIG. 10. The damper device 10 can thus significantly effectively damp the vibration of the driven member 15 by making the amplitude of the vibration of the first torque transmission path TP1 equal to the amplitude of the vibration of the rotary inertia mass damper 20 in the opposite phase at two points corresponding to the two resonances occurring in the first torque transmission path TP1.

A vehicle equipped with the engine EG as the source of generating power for driving may be configured as to further decrease a lockup rotation speed Nlup of the lockup clutch 8 and mechanically transmit the torque from the engine EG to the transmission TM at an earlier timing, such as to improve the power transmission efficiency between the engine EG and the transmission TM and thereby further improve the fuel consumption of the engine EG. The vibration transmitted from the engine EG via the lockup clutch 8 to the drive member 11, however, increases in a low rotation speed range of approximately 500 rpm to 1500 rpm that is likely to be set as a range of the lockup rotation speed Nlup. The vibration level significantly increases especially in a vehicle equipped with a smaller-number cylinder engine such as three-cylinder engine or four-cylinder engine. Accordingly, in order to suppress transmission of a large vibration to the transmission TM and so on during or immediately after engagement the lockup, there is a need to further reduce the vibration level in a rotation speed range of about the lockup rotation speed Nlup of the entire damper device 10 (driven member 15) configured to transmit the torque (vibration) from the engine EG to the transmission TM under engagement of the lockup.

By taking into account the foregoing, the inventors have configured the damper device 10 such as to form the antiresonance point A1 of the lower rotation speed side (lower frequency side) when the rotation speed Ne of the engine EG is in the range of 500 rpm to 1500 rpm (in the expected setting range of the lockup rotation speed Nlup), based on the predetermined lockup rotation speed Nlup of the lockup clutch 8. Two solutions $\omega_1$ and $\omega_2$ of Equation (5) given above may be obtained as Equations (6) and (7) given below according to the quadratic formula, and satisfy $\omega_1 < \omega_2$. A frequency $fa_1$ at the antiresonance point A1 of the lower rotation speed side (lower frequency side) (hereinafter referred to as "minimum frequency") is expressed by Equation (8) given below, and a frequency $fa_2$ at an antiresonance point A2 of the higher rotation speed side (higher frequency side) ($fa_2 > fa_1$) is expressed by Equation (9) given below. A rotation speed $Nea_1$ of the engine EG corresponding to the minimum frequency $fa_1$ is expressed as $Nea_1 = (120/n) \cdot fa_1$, where "n" denotes the number of cylinders of the engine EG.

[Math. 5]

$$\omega_1^2 = \frac{(k_1+k_2) - \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2} \quad (6)$$

$$\omega_2^2 = \frac{(k_1+k_2) + \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2} \quad (7)$$

$$fa_1 = \frac{1}{2\pi} \sqrt{\frac{(k_1+k_2) - \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2}} \quad (8)$$

$$fa_2 = \frac{1}{2\pi} \sqrt{\frac{(k_1+k_2) + \sqrt{(k_1+k_2)^2 - 4 \cdot \frac{J_2}{J_i} \cdot k_1 \cdot k_2 \cdot \frac{1}{\lambda(1+\lambda)}}}{2 \cdot J_2}} \quad (9)$$

Accordingly, the combined spring constant $k_1$ of the plurality of first springs SP1, the combined spring constant $k_2$ of the plurality of second springs SP2, the moment of inertia $J_2$ of the intermediate member 12 (determined by taking into account (summing up) the moments of inertia of the turbine runner 5 and the like coupled to be integrally rotated), and the moment of inertia $J_i$ of the ring gear 25 that is the mass body of the rotary inertia mass damper 20 are selected and set in the damper device 10, in order to satisfy Expression (10) given below. More specifically, in the damper device 10, the spring constants $k_1$ and $k_2$ of the first and the second springs SP1 and SP2, the moment of inertia $J_2$ of the intermediate member 12, the moment of inertia $J_i$ of the ring gear 25, and the gear ratio $\lambda$ of the planetary gear 21 are determined, based on the above minimum frequency $fa_1$ (and the lockup rotation speed Nlup). When designing the damper device 10, a moment of the inertia of the pinion gear 23 may be ignored in practice as shown in Equations (2)-(9) and may be taken into account in the above equation (2) and the like. Further, the spring constants $k_1$ and $k_2$ of the first and the second springs SP1 and SP2, the moment of inertia $J_2$ of the intermediate member 12, the moment of inertia $J_i$ of the ring gear 25, the gear ratio $\lambda$ of the planetary gear 21, and the moment of the inertia of the pinion gear 23 may be determined, based on the above minimum frequency $fa_1$ (and the lockup rotation speed Nlup).

[Math. 6]

$$500\,rpm \leq \frac{120}{n} fa_1 \geq 1500\,rpm \quad (10)$$

As described above, the antiresonance point A1 of the lower rotation speed side that is likely to provide theoretically zero vibration amplitude $\Theta_3$ of the driven member 15 (that is likely to further decrease the vibration amplitude $\Theta_3$) may be set in the low rotation speed range of 500 rpm to 1500 rpm (in the expected setting range of the lockup rotation speed Nlup). This results in allowing for the lockup (coupling of the engine EG with the drive member 11) at the lower rotation speed.

When the damper device 10 is configured to satisfy Expression (10), it is preferable to select and set the spring constants $k_1$ and $k_2$ and the moments of inertia $J_2$ and $J_i$, such as to minimize the frequency of the lower rotation-speed (lower-frequency) side resonance (at a resonance point R1) occurring in the first torque transmission path TP1 to the minimum possible value that is lower than the above minimum frequency $fa_1$. This further reduces the minimum frequency $fa_1$ and allows for the lockup at the further lower rotation speed.

Moreover, the configuration capable of setting two antiresonance points A1 and A2 enables the antiresonance point A1 having the minimum frequency ($fa_1$) between the two antiresonance points A1 and A2 to be shifted toward the lower frequency side, compared with the configuration that only one antiresonance point is set (shown by a broken line curve in FIG. 10). Additionally, as seen from FIG. 10, the configuration that the two antiresonance points A1 and A2 are set enables the vibration from the engine EG transmitted from the drive member 11 to the driven member 15 via the first torque transmission path TP1 (shown by the one-dot chain line curve in FIG. 10) to be effectively damped by the vibration transmitted from the drive member 11 to the driven member 15 via the rotary inertia mass damper 20 (shown by the two-dot chain line curve in FIG. 10) in a relatively wide rotation speed range between the two antiresonance points A1 and A2.

This further improves the vibration damping effect of the damper device 10 in the lower rotation speed range of a lockup area that is likely to increase the vibration from the engine EG. In the damper device 10, on the occurrence of the second resonance (resonance as shown by the resonance point R2 in FIG. 10), the intermediate member 12 is vibrated in the opposite phase to that of the driven member 15. As shown by the one-dot chain line curve in FIG. 10, the phase of the vibration transmitted from the drive member 11 to the driven member 15 via the first torque transmission path TP1 becomes identical with the phase of the vibration transmitted from the drive member 11 to the driven member 15 via the rotary inertia mass damper 20.

In the damper device 10 configured as described above, in order to further improve the vibration damping performance around the lockup rotation speed Nlup, there is a need to appropriately separate the lockup rotation speed Nlup and the rotation speed Ne of the engine EG corresponding to the resonance point R2. Accordingly, when the damper device 10 is configured to satisfy Expression (10), it is preferable to select and set the spring constants $k_1$ and $k_2$ and the moments of inertia $J_2$ and $J_i$, such as to satisfy Nlup$\leq$(120/n)·$fa_1$ (=$Nea_1$). This engages the lockup by the lockup clutch 8, while effectively suppressing transmission of the vibration to the input shaft IS of the transmission TM. This also enables the vibration from the engine EG to be remarkably effectively damped by the damper device 10, immediately after engagement of the lockup.

As described above, designing the damper device 10 based on the frequency (minimum frequency) $fa_1$ at the antiresonance point A1 remarkably effectively improves the vibration damping performance of the damper device 10. According to the inventors' studies and analyses, it has been confirmed that when the lockup rotation speed Nlup is set to, for example, a value of about 1000 rpm, the damper device 10 configured to satisfy, for example, 900 rpm$\leq$(120/n)·$fa_1$$\leq$1200 rpm provides the remarkably effective results in practice.

On the other hand, it is necessary to decrease both a hysteresis of the first torque transmission path TP1 including the intermediate member 12, the first and the second springs SP1 and SP2 and a hysteresis of the rotary inertia mass damper 20 as much as possible such as to decrease an actual vibration amplitude of the driven member 15 about the antiresonance points A1 and A2. That is, in the damper device 10, it is necessary to decrease both a phase shift of a vibration transmitted to the driven member 15 via the first torque transmission path TP1, the phase shift caused by the hysteresis of the first and second springs SP1 and SP2, and a phase shift of a vibration transmitted to the driven member 15 via the rotary inertia mass damper 20, the phase shift caused by the hysteresis of the rotary inertia mass damper 20.

Therefore, in the damper device 10, the driven member 15 working as the sun gear of the planetary gear 21 of the rotary inertia mass damper 20 is provided with the outer teeth 15t located radially outside the first and the second springs SP1 and SP2 that transmit the torque between the drive member 11 and the driven member 15. That is, the first and the second springs SP1 and SP2 are disposed radially inside the planetary gear 21 of the rotary inertia mass damper 20. Accordingly, the centrifugal force applied to the first and the second springs SP1 and SP2 is reduced, thereby decreasing a frictional force (sliding resistance) that occurs when the first and the second springs SP1 and SP2 are pressed against the spring supporting portions 121s and 122 by the centrifugal force. As a result, the hysteresis of the first and the second springs SP1 and SP2 is satisfactorily decreased in the damper device 10.

Furthermore, an energy loss caused by the hysteresis of the rotary inertia mass damper 20 may be expressed as $Jh=\Delta T \cdot \theta$. Herein "Jh" denotes energy loss caused by the hysteresis of the rotary inertia mass damper 20, "$\Delta T$" denotes a torque difference, that is, a difference between the torque transmitted to the driven member 15 (sun gear) from the rotary inertia mass damper 20 when a relative displacement between the drive member 11 and the driven member 15 increases and a torque transmitted to the driven member 15 (sun gear) from the rotary inertia mass damper 20 when the relative displacement between the drive member 11 and the driven member 15 decreases, and "$\theta$" denotes a torsion angle of the drive member 11 relative to the driven member 15. Further, the energy loss Jh may be expressed as $Jh=\mu \cdot Fr \cdot x$. Herein "$\mu$" denotes a coefficient of dynamic friction between the ring gear 25 and the pinion gear 23, "Fr" denotes a vertical load (axial force) applied to the ring gear 25 according to a pressure in the fluid chamber 9 for example, and "x" denotes a sliding distance of the ring gear 25 with respect to the pinion gear 23.

Accordingly, a relationship $\Delta T \cdot \theta = \mu \cdot Fr \cdot x$ is satisfied. By differentiating both sides of the relational expression by time, a relationship $\Delta T \cdot d\theta/dt = \mu \cdot Fr \cdot dx/dt$ is derived. The torque difference $\Delta T$ or the hysteresis of the rotary inertia mass damper 20 thus may be expressed as $\Delta T = \mu \cdot Fr \cdot (dx/dt)/(d\theta/dt)$. The time differential value dx/dt of the sliding distance x in the right side of the relational expression showing the torque difference $\Delta T$ shows a relative speed Vrp between the ring gear 25 and the pinion gears 23. The hysteresis of the rotary inertia mass damper 20 thus becomes smaller as the relative speed Vrp between the ring gear 25 and the pinion gears 23 that support the ring gear 25, that is, a relative speed between the mass body and a support member that restricts an axial motion of the mass body becomes smaller.

Figure 11:
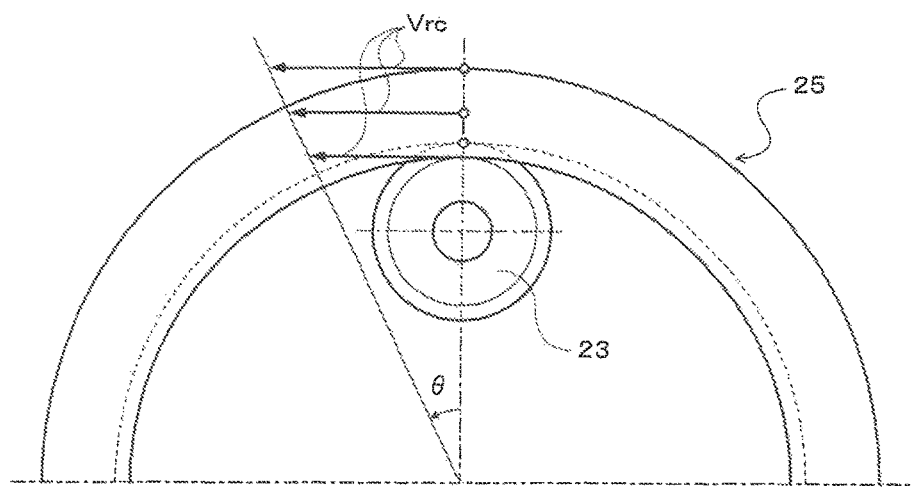
FIG. 11 is a schematic diagram illustrating a relative velocity between a ring gear of the rotary inertia mass damper and a drive member of the damper device.

When the ring gear 25 or the mass body is supported from both sides by the first and the second input plate members 111 and 112 of the drive member 11 or the carrier of the planetary gear 21, the hysteresis of the rotary inertia mass damper 20 depends on a relative speed Vrc between the ring gear 25 and the drive member 11. FIG. 11 shows the relative speed Vrc between the ring gear 25 and the drive member 11 when the drive member 11 is twisted in the angle $\theta$ with respect to the driven member 15. As shown in FIG. 11, the relative speed Vrc is relatively large about the inner circumference of the ring gear 25 and becomes larger from the inner circumference to the outer circumference of the ring gear 25. The hysteresis of the rotary inertia mass damper 20 is not favorably decreased when the ring gear 25 or the mass body is supported from both sides by the first and the second input plate members 111 and 112.

Figure 12:
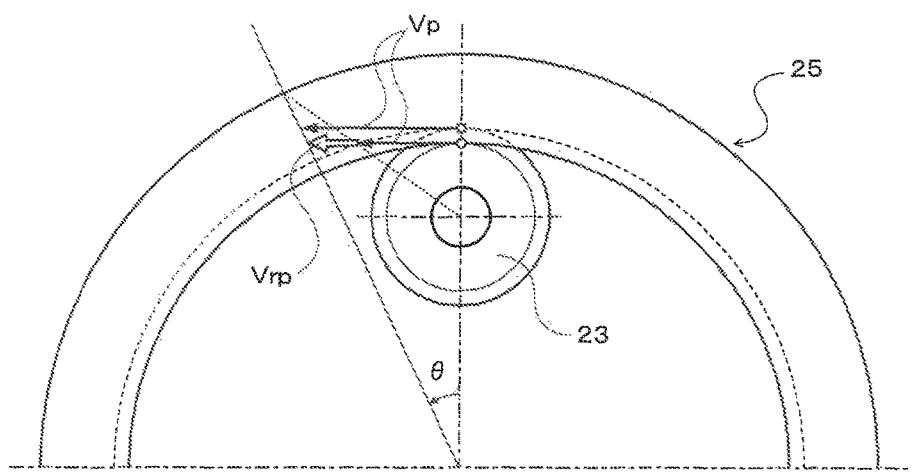
FIG. 12 is a schematic diagram illustrating a relative velocity between the ring gear and a pinion gear of the rotary inertia mass damper.
Figure 13:
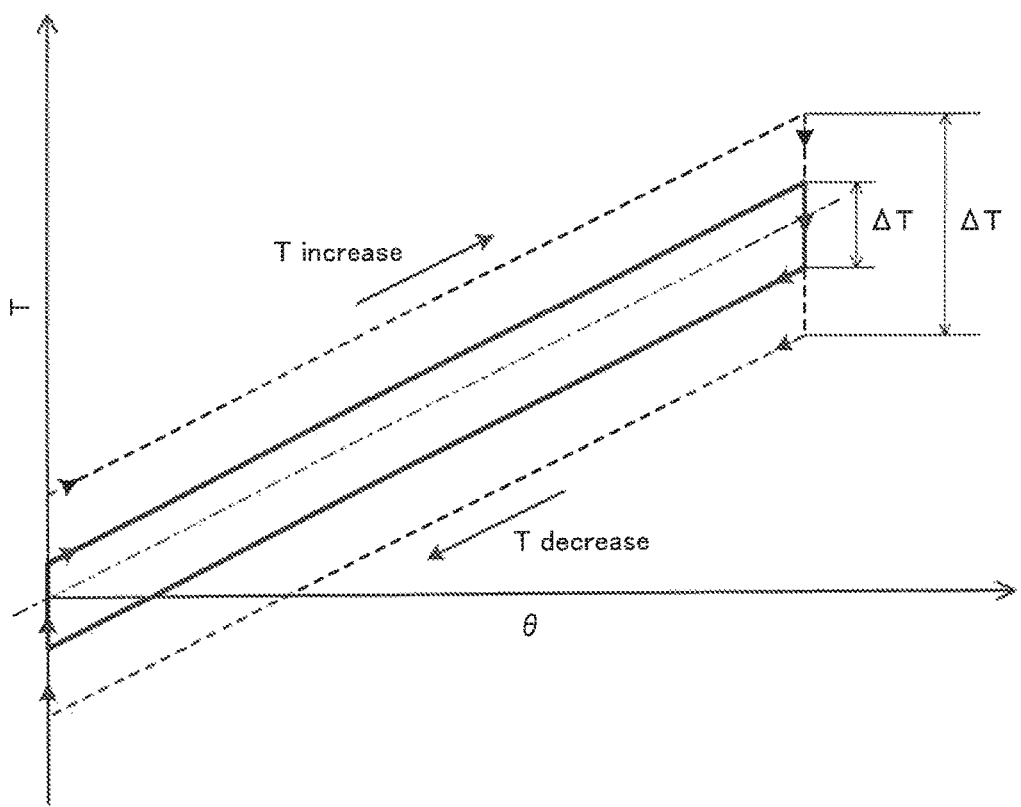
FIG. 13 is a schematic diagram illustrating a torque difference obtained by quantifying a hysteresis of the rotary inertia mass damper of the damper device according to the disclosure.

On the other hand, the pinion gears 23 revolve at a peripheral speed Vp that is identical with a peripheral speed of the first and the second input plate members 111 and 112 or the carrier and rotate about the pinion shaft 24. The relative speed Vrp between the ring gear 25 and the pinion gear 23 becomes substantially zero about an engagement position (a point on a broken line in FIGS. 11 and 12) between the inner tooth 25t of the ring gear 25 and the gear tooth 23t of the pinon gear 23. As illustrated by a white arrow in FIG. 12, the relative speed Vrp between the ring gear 25 and the pinion gear 23 becomes significantly smaller than the relative speed Vrc between the ring gear 25 and the drive member 11 (carrier) and smaller than the relative speed (not shown) between the ring gear 25 and the driven member 15 (sun gear). In the damper device 10 in which the axial motion of the ring gear 25 or the mass body is restricted by the pinion gears 23 of the planetary gear 21, as illustrated by a solid line in FIG. 13, the hysteresis of the rotary inertia mass damper 20, that is, the torque difference $\Delta T$ is satisfactorily decreased, compared with supporting the ring gear 25 from both sides by the first and second input plate members 111 and 112 (see a broken line in FIG. 13).

In this embodiment, the ring gear 25 includes the two side plates 251 (supported portions) fixed to each of the side face of the gear body 250 in such a manner that the inner circumferential surface of each side plate 251 is located slightly inside tips of the inner teeth 25t. Further, the axial motion of the ring gear 25 is restricted by at least the side face of gear teeth 23t of the pinion gears 23. Accordingly, the axial motion of the ring gear 25 can be restricted by the pinion gears 23 at the engagement position between the inner tooth 25t and the gear tooth 23t where the relative speed Vrp between the ring gear 25 and the pinion gear 23 becomes substantially zero, thereby satisfactorily decreasing the hysteresis of the rotary inertia mass damper 20.

As described above, the damper device 10 satisfactorily decreases both the hysteresis in the first torque transmission path TP1 and the hysteresis in the rotary inertia mass damper 20, thereby favorably decreasing the actual vibration amplitude of the driven member 15 about the antiresonance points A1 and A2. Therefore, the vibration damping performance of the damper device 10 including the rotary inertia mass damper 20 is effectively improved by making the frequency $fa_1$ of the antiresonance point A1 of the lower rotation speed side equal to (closer to) a frequency of one vibration (resonance) to be damped by the damper device in the above range and making the frequency $fa_2$ of the antiresonance point A2 of the higher rotation speed side equal to (closer to) a frequency of the other vibration (resonance) to be damped by the damper device. Further, the vibration damping performance of the rotary inertia mass damper 20 is advantageously improved by decreasing the hysteresis of the rotary inertia mass damper 20 as has been described.

In the damper device 10, the driven member 15 or the sun gear, the plurality of pinion gears 23 and the ring gear 25 are arranged to at least partially overlap with the first and the second springs SP1 and SP2 (and the inner spring SPi) in the axial direction of the damper device 10 as viewed in the radial direction. This configuration further shortens the axial length of the damper device 10 and further increases the moment of inertia of the ring gear 25 by disposing the ring gear 25 in the outer circumference side of the damper device 10 while suppressing an increase of the weight of the ring gear 25 that works as the mass body of the rotary inertia mass damper 20, thereby enabling the inertia torque to be efficiently obtained.

Further, in the damper device 10, the rotation speed of the ring gear 25 or the mass body is increased by the action of the planetary gear 21 such as to be higher than the rotation speed of the drive member 11 (carrier). This reduces the weight of the ring gear 25 or the mass body while effectively ensuring the moment of inertia applied to the driven member 15 from the rotary inertia mass damper 20. This also enhances the flexibility in design of the rotary inertia mass damper 20 and the entire damper device 10. The rotary inertia mass damper 20 (planetary gear 21) may, however, be configured to decrease the rotation speed of the ring gear 25 to be lower than the rotation speed of the drive member 11, according to the magnitude of the moment of inertia of the ring gear 25 (mass body). Further, the planetary gear 21 may be a double pinion-type planetary gear. Furthermore, the outer tooth 15*t* of the driven member 15, the gear tooth 23*t* of the pinion gear 23 and the inner tooth 25*t* of the ring gear 25 may be a helical tooth with a helical tooth trace or a tooth with a straight tooth trace.

As described above, the configuration that two antiresonance points A1 and A2 are set enables the antiresonance point A1 to be shifted toward the lower frequency. Depending on the specification of the vehicle, the motor and so on equipped with the damper device 10, the multiple root of Equation (5) $(=\frac{1}{2}\pi \cdot \sqrt{\{(k_1+k_2)/(2 \cdot J_2)\}}$ may be set to the above minimum frequency $fa_1$. Determining the spring constants $k_1$ and $k_2$ of the first and the second springs SP1 and SP2 and the moment of inertia $J_2$ of the intermediate member 12 based on the multiple root of Equation (5) also improves the vibration damping effect of the damper device 10 in the lower rotation speed range of the lockup area that is likely to increase the vibration from the engine EG as shown by the broken line curve in FIG. 10.

In the damper device 10 described above, springs having the identical specification (spring constant) are employed for the first and the second springs SP1 and SP2. This is, however, not restrictive. The spring constants $k_1$ and $k_2$ of the first and the second inner springs SP1 and SP2 may be different from each other ($k_1 > k_2$ or $k_1 < k_2$). This further increases the value of the $\sqrt{}$ term (discriminant) in Equations (6) and (8) and further increases the interval between the two antiresonance points A1 and A2, thus further improving the vibration damping effect of the damper device in the low frequency range (low rotation speed range). In this case, the damper device 10 may be provided with a stopper configured to restrict the deflection of one of the first and the second inner SP1 and SP2 (for example, one having the lower rigidity).

As described above, the ring gear 25 of the rotary inertia mass damper 20 includes two side plates 251 respectively fixed to the gear body 250 in such a manner that the inner circumferential surface of each side plate 251 is located slightly inside tips of the inner teeth 25*t*. However, each of the two side plates 251 may be fixed to the gear body 250 in such a manner that the inner circumferential surface of each side plate 251 is located radially inside bottoms of the inner teeth 25*t* and radially outside the pinion shaft supporting the pinion gear 23. Further, a diameter of the radially supporting portion 230*s* of the pinion gear 23 (gear body 230) may also be reduced to be smaller than the above diameter. Namely, the inner circumferential surface of each side plate 251 of the ring gear 25 may be made close to the pinion shaft 24, so that the axial motion of the ring gear 25 is satisfactorily restricted by the pinion gears 23.

In order to restrict the axial motion of the ring gear 25 by the pinion gears 23, the pinion gear 23 may be provided with a pair of supporting portions that have an annular shape for example and protrude radially outside from both sides of the gear teeth 23*t* and the side plates 251 may be omitted from the ring gear 25. In such a configuration, the supporting portions of the pinion gear 23 may be formed such as to oppose to at least the side face of the inner teeth 25*t* of the ring gear 25 or a portion of the side face of the gear body 250.

Figure 14:
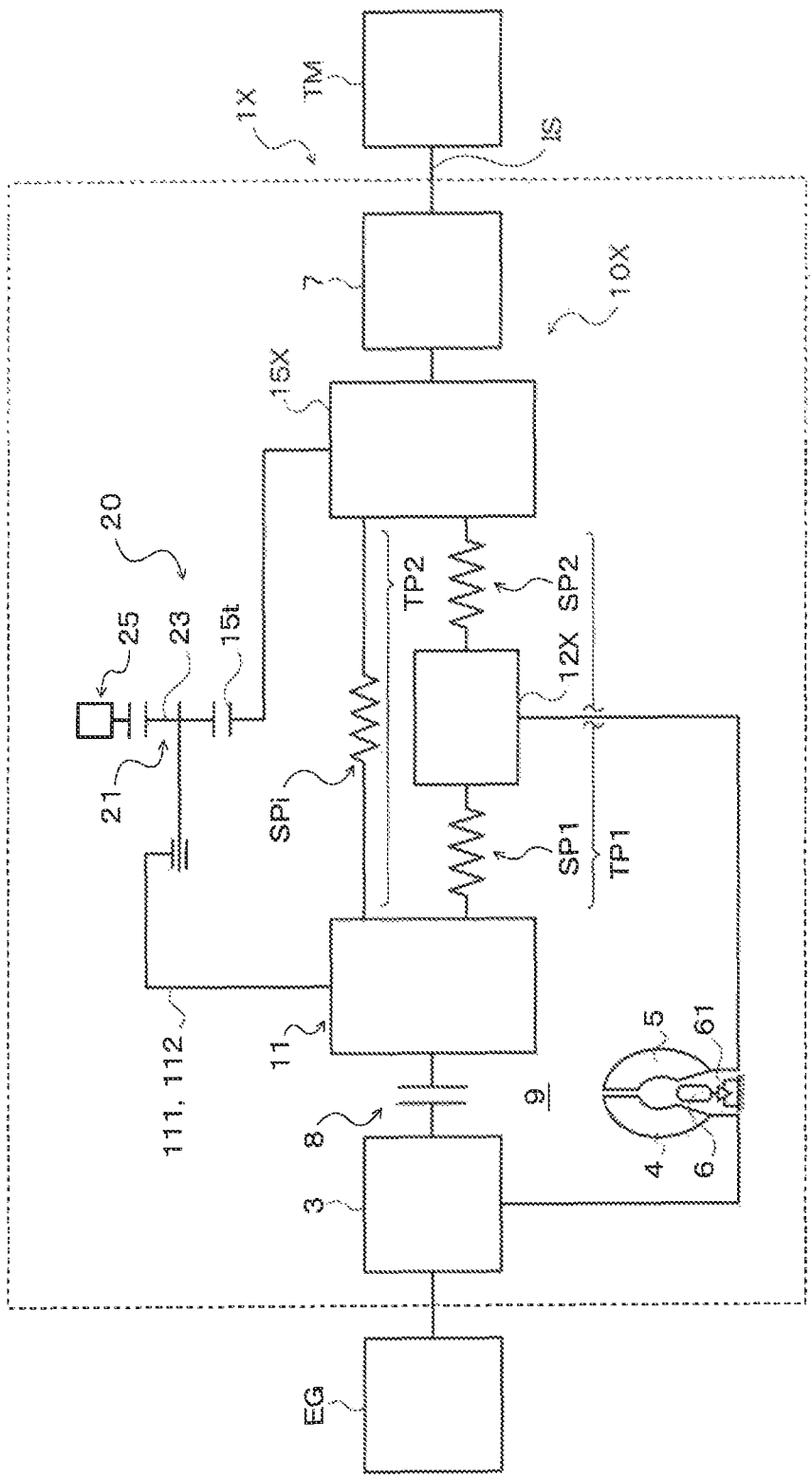
FIG. 14 is a schematic configuration diagram illustrating a starting device including a damper device according to another embodiment of the disclosure.

As in a damper device 10X of a starting device 1X shown in FIG. 14, an intermediate member 12X may be coupled with the turbine runner 5 to be integrally rotated instead of coupling the driven member 15X with the turbine runner 5 to be integrally rotated. This configuration allows for a further increase of the substantial moment of inertia $J_2$ of the intermediate member 12X (total moments of inertia of the intermediate member 12X, the turbine runner 5 and the like). In this configuration, as seen from the Equation (8), the frequency $fa_1$ of the antiresonance point A1 may be further reduced such as to set the antiresonance point A1 in the further lower rotation speed side (further lower frequency side).

In the damper devices 10, 10X, the sun gear of the planetary gear 21 may be coupled (integrated) with the drive member 11, and the driven members 15, 15X may be configured to work as the carrier of the planetary gear 21. Further, in the damper devices, 10X, the sun gear of the planetary gear 21 may be coupled (integrated) with the intermediate members 12, 12X, and the drive member 11 or the driven members 15, 15X may be configured to work as the carrier of the planetary gear 21. Furthermore, in the damper devices 10, 10X, the intermediate members 12, 12X may be configured to work as the carrier of the planetary gear 21, and the sun gear of the planetary gear 21 may be coupled (integrated) with the drive member 11 or the driven members 15, 15X.

Figure 15:
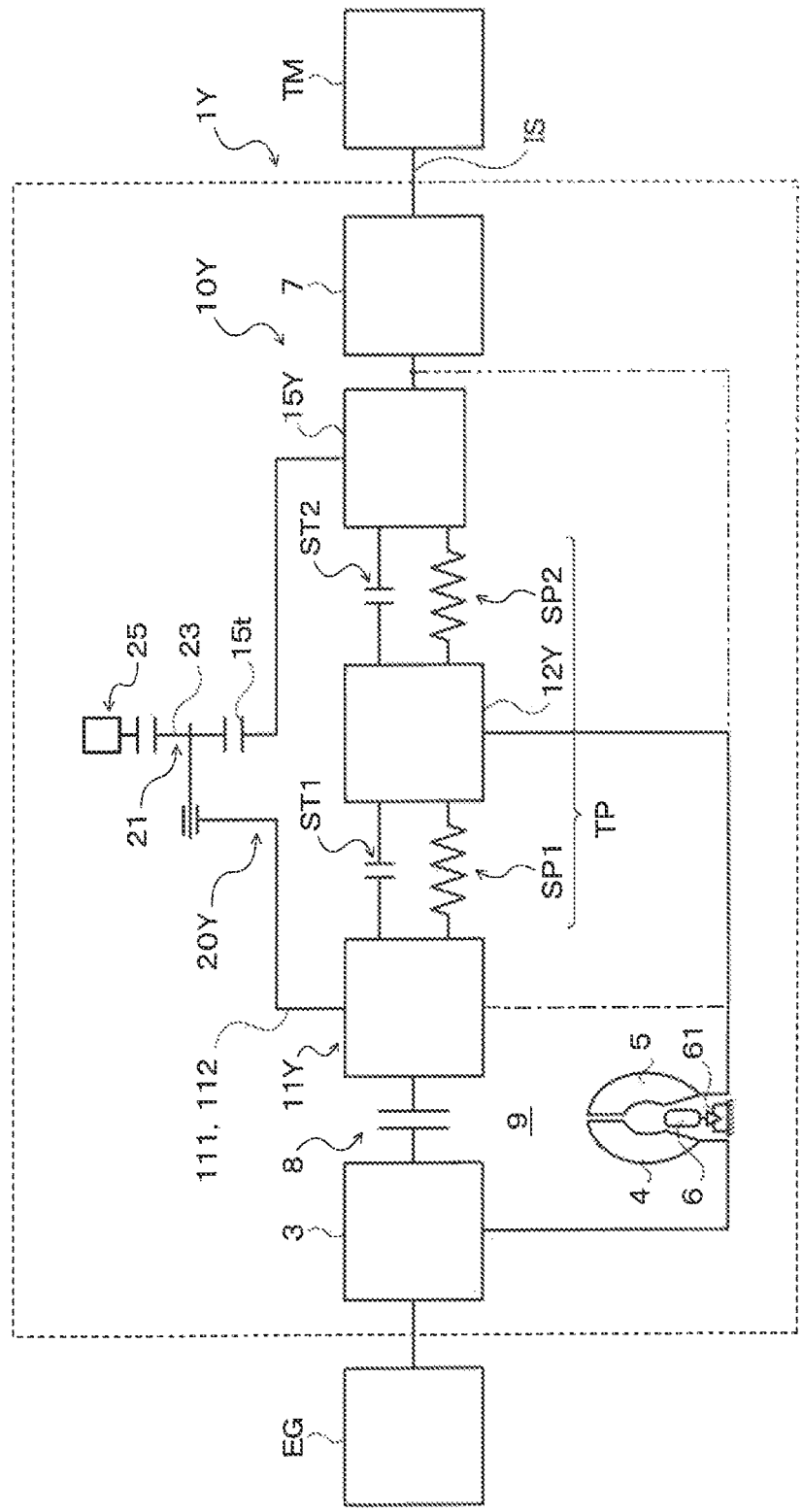
FIG. 15 is a schematic configuration diagram illustrating a starting device including a damper device according to yet another embodiment of the disclosure.

FIG. 15 is a schematic configuration diagram illustrating a starting device 1Y including a damper device 10Y according to another embodiment of the disclosure. Among the components of the starting device 1Y and the damper device 10Y, the same components to those of the starting device 1 and the damper device 10 described above are expressed by the same reference signs and their repeated description is omitted.

The damper device 10Y shown in FIG. 15 includes a drive member (input element) 11Y, an intermediate member (intermediate element) 12Y and a driven member (output element) 15Y, as rotational elements. The damper device 10Y also includes a plurality of first springs (first elastic bodies) SP1 configured to transmit the torque between the drive member 11Y and the intermediate member 12Y and a plurality of second springs (second elastic bodies) SP2 configured to respectively work in series with the corresponding first springs SP1 and to transmit the torque between the intermediate member 12Y and the driven member 15Y, as torque transmission elements (torque transmission elastic bodies). The plurality of first springs (first elastic bodies) SP1, the intermediate member 12Y and the plurality of second springs (second elastic bodies) SP2 configure a torque transmission path TP between the drive member 11Y and the driven member 15Y. As shown in the figure, the intermediate member 12Y is coupled with the turbine runner to be integrally rotated. As shown by a two-dot chain line in FIG. 15, however, the turbine runner 5 may be coupled with either one of the drive member 11Y and the driven member 15Y.

As the above rotary inertia mas damper 20, a rotary inertia mass damper 20Y includes the single pinion-type planetary gear 21 and is arranged parallel to the torque transmission path TP between the drive member 11Y and the driven member 15Y. In the rotary inertia mass damper 20Y, the drive member 11Y (first and second input plate members 111 and 112) is configured to rotatably support the plurality of the pinion gears 23 such as to work as the carrier of the planetary gear 21. The driven member 15Y is configured to include outer teeth 15*t* and work as the sun gear of the planetary gear 21. In the rotary inertia mass damper 20Y, the axial motion of the ring gear 25 or the mass body is restricted by the pinion gear 23.

The damper device 10Y further includes a first stopper ST1 configured to restrict the relative rotation of the drive member 11Y to the intermediate member 12Y, i.e., deflection of the first springs SP1 and a second stopper ST2 configured to restrict the relative rotation of the intermediate member 12Y to the driven member 15Y, i.e., deflection of the second springs SP2. One of the first stopper ST1 and the second stopper ST2 is configured to restrict the relative rotation of the drive member 11Y to the intermediate member 12Y or the relative rotation of the intermediate member 12Y to the driven member 15Y when the input torque into the drive member 11Y reaches a predetermined torque T1 that is smaller than a torque T2 corresponding to a maximum torsion angle θmax of the damper device 10Y and the torsion angle of the drive member 11Y relative to the driven member 15Y becomes equal to or larger than a predetermined angle θref. The other of the first stopper ST1 and the second stopper ST2 is configured to restrict the relative rotation of the intermediate member 12Y to the driven member 15Y or the relative rotation of the drive member 11Y to the intermediate member 12Y when the input torque into the drive member 11Y reaches the torque T2.

This configuration allows for the deflections of the first and the second springs SP1 and SP2 until one of the first and the second stoppers ST1 an ST2 operates. When one of the first and the second stoppers ST1 and ST2 operates, the deflection of one of the first and the second springs SP1 and SP2 is restricted. When both the first and the second stoppers ST1 and ST2 operate, the deflections of both the first and the second springs SP1 and SP2 are restricted. The damper device 10Y accordingly has two-step (two-stage) damping characteristics. The first stopper ST1 or the second stopper ST2 may be configured such as to restrict the relative rotation of the drive member 11Y to the driven member 15Y.

The damper device 10Y configured as described above provides the similar operations and advantageous effects to those of the damper device 10 described above. In the damper device 10Y, one of the first and the second springs SP1 and SP2 may be arranged on the outer side in the radial direction of the other at intervals in the circumferential direction. More specifically, for example, the plurality of first springs SP1 may be arranged in an outer circumferential-side area in the fluid transmission chamber 9 at intervals in the circumferential direction. The plurality of second springs SP2 may be arranged on the inner side in the radial direction of the plurality of first springs SP1 at intervals in the circumferential direction. In this configuration, the first and the second springs SP1 and SP2 may be arranged to at least partially overlap with each other as viewed in the radial direction.

In the damper device 10Y, the sun gear of the planetary gear 21 may be coupled (integrated) with the drive member 11Y, and the driven member 15Y may be configured to work as the carrier of the planetary gear 21. Further, in the damper device 10Y, the sun gear of the planetary gear 21 may be coupled (integrated) with the intermediate member 12Y, and the drive member 11Y or the driven member 15Y may be configured to work as the carrier of the planetary gear 21. Furthermore, in the damper device 10Y, the intermediate member 12Y may be configured to work as the carrier of the planetary gear 21, and the sun gear of the planetary gear 21 may be coupled (integrated) with the drive member 11Y or the driven member 15Y.

Figure 16:
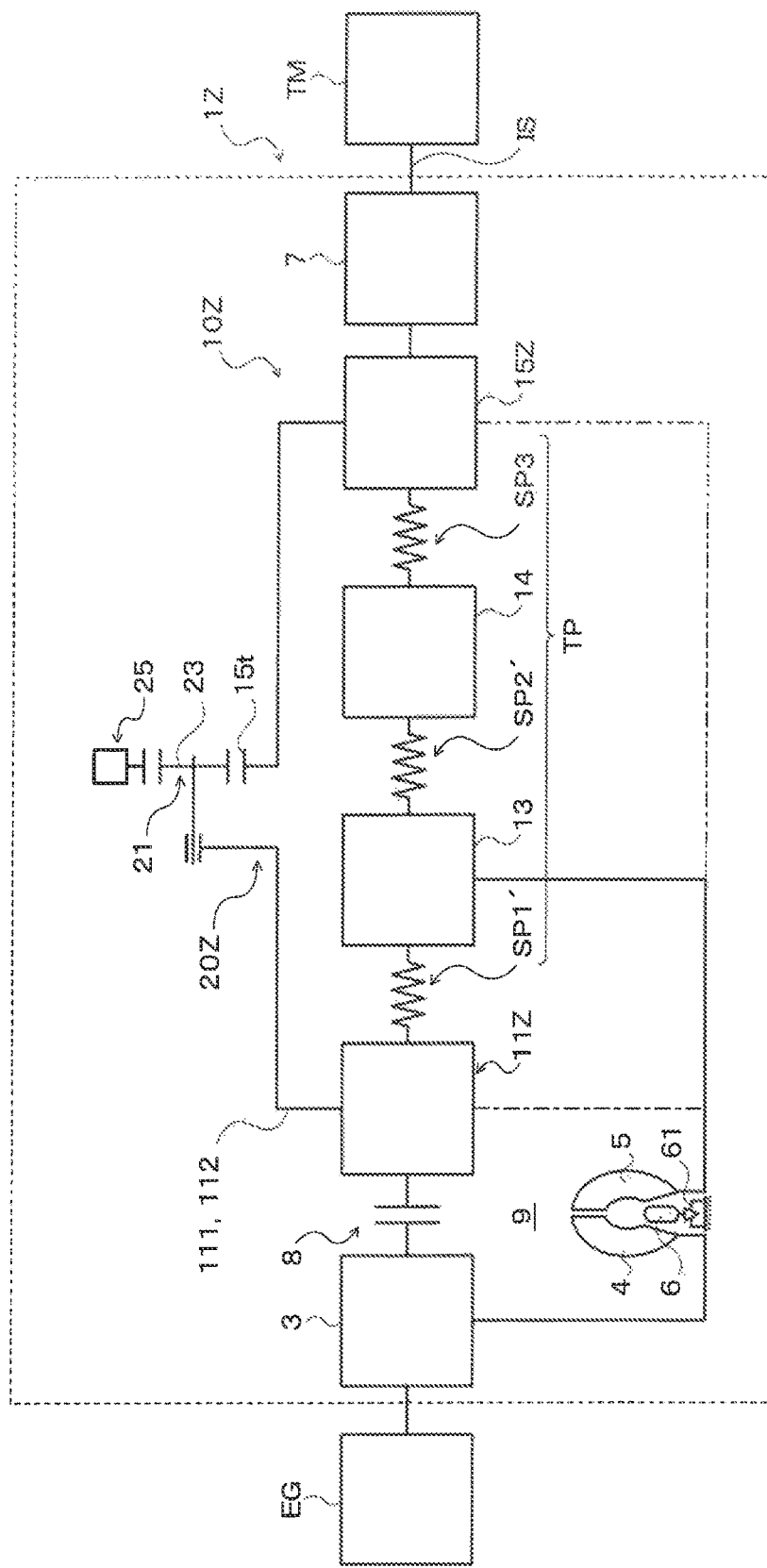
FIG. 16 is a schematic configuration diagram illustrating a starting device including a damper device according to another embodiment of the disclosure.

FIG. 16 is a schematic configuration diagram illustrating a starting device 12Z including a damper device 10Z according to yet another embodiment of the disclosure. Among the components of the starting device 1Z and the damper device 10Z, the same components to those of the starting device 1 and the damper device 10 described above are expressed by the same reference signs and their repeated description is omitted.

The damper device 10Z shown in FIG. 16 includes a drive member (input element) 11Z, a first intermediate member (first intermediate element) 13, a second intermediate member (second intermediate element) 14 and a driven member (output element) 15Z, as rotational elements. The damper device 10Z also includes a plurality of first springs (first elastic bodies) SP1' configured to transmit the torque between the drive member 11Z and the first intermediate member 13, a plurality of second springs (second elastic bodies) SP2' configured to transmit the torque between the first intermediate member 13 and the second intermediate member 14, and a plurality of third springs (third elastic bodies) SP3 configured to transmit the torque between the second intermediate member 14 and the driven member 15Z, as torque transmission elements (torque transmission elastic bodies). The plurality of first springs (first elastic bodies) SP1', the first intermediate member 13, the plurality of second springs (second elastic bodies) SP2', the second intermediate member 14 and the plurality of third springs SP3 configure a torque transmission path TP between the drive member 112 and the driven member 15Z. As the rotary inertia mass dampers 20, 20Y, a rotary inertia mass damper 20Z includes the single pinion-type planetary gear 21 and is arranged parallel to the torque transmission path TP between the drive member 11Z and the driven member 15Z. The first intermediate member 13 is coupled with the turbine runner 5 to be integrally rotated. As shown by a two-dot chain line in FIG. 16, however, the turbine runner 5 may be coupled with either one of the drive member 11Z and the driven member 15Z.

In the damper device 10Z including the first and the second intermediate members 13 and 14, three resonances occur in the torque transmission path TP when the deflections of all the first to the third springs SP1', SP2' and SP3 are allowed. More specifically, a resonance of the entire damper device 10Z occurs in the torque transmission path TP by the vibrations of the drive member 11Z and the driven member 15Z in the opposite phases when the deflections of the first to the third springs SP1', SP2' and SP3 are allowed. A resonance also occurs in the torque transmission path TP by the vibrations of the first and the second intermediate members 13 and 14 in the opposite phase to both the drive member 11Z and the driven member 15Z when the deflections of the first to the third springs SP1', SP2' and SP3 are allowed. A resonance further occurs in the torque transmission path TP by the vibration of the first intermediate member 13 in the opposite phase to the drive member 11Z, the vibration of the second intermediate member 14 in the opposite phase to the first intermediate member 13 and the vibration of the driven member 15Z in the opposite phase to the second intermediate member 14 when the deflections of the first to the third springs SP1', SP2' and SP3 are allowed. This configuration thus enables a total of three antiresonance points, where the vibration transmitted from the drive member 11Z to the driven member 15Z via the torque transmission path TP and the vibration transmitted from the drive member 11Z to the driven member 15Z via the rotary inertia mass damper 20Z are theoretically cancelled out each other, to be set in the damper device 10Z.

Among the three antiresonance points that are likely to provide theoretically zero vibration amplitude of the driven member 15Z (that are likely to further decrease the vibration amplitude), a first antiresonance point of the lowest rotation speed may be set in the low rotation speed range of 500 rpm to 1500 rpm (in the expected setting range of the lockup rotation speed Nlup). This shifts one resonance having the minimum frequency of the resonances occurring in the torque transmission path TP toward the lower rotation speed side (toward the lower frequency side), such as to be included in a non-lockup area of the lockup clutch 8. This results in allowing for the lockup at the lower rotation speed and remarkably effectively improving the vibration damping performance of the damper device 10Z in the low rotation speed range that is likely to increase the vibration from the engine EG. The damper device 10Z may make a second antiresonance point of the higher rotation speed side (higher frequency side) than the first antiresonance point equal to (closer to), for example, resonance point (frequency thereof) of the input shaft IS of the transmission TM or may make a third antiresonance point of the higher rotation speed side (higher frequency side) than the second antiresonance point equal to (closer to), for example, a resonance point (frequency thereof) in the damper device 10Z, such as to effectively suppress the occurrence of such resonances.

The damper device 10Z may be configured such as to include three or more intermediate members in the torque transmission path TP. The turbine runner 5 may be coupled with the second intermediate member 14 or may be coupled with one of the drive member 11Z and the driven member 15Z as shown by a two-dot chain line in FIG. 16. In the damper device 10Z, the sun gear of the planetary gear 21 may be coupled (integrated) with the drive member 11Z, and the driven member 15Z may be configured to work as the carrier of the planetary gear 21. Further, in the damper device 10Z, the sun gear of the planetary gear 21 may be coupled (integrated) with the first intermediate member 13. The first intermediate member 13 may be configured to work as the carrier of the planetary gear 21 in the damper device 10Z.

As has been described above, a damper device (10) according to one aspect of the disclosure is configured to include an input element (11) to which a torque from an engine (EG) is transmitted, an output element (15), an intermediate element (12) arranged to be connected to the input element (11) and the output element (15), the intermediate element (12) including elastic bodies, and a rotary inertia mass damper (20) configured to include a planetary gear that includes a sun gear (15t) arranged to rotate integrally with one element (15) of the input element (11) and the output element (15), a carrier that rotatably supports a plurality of pinion gears (23) and is arranged to rotate integrally with the other element (11) of the input element (11) and the output element (15), and a ring gear that meshes with the plurality of pinion gears (23) and works as a mass body. The other element (11) is configured to include two plate members (111, 112) that are opposed to each other and coupled with each other by means of a plurality of rivets (11rm) disposed between the pinion gears (23).

In the damper device of this aspect, one element of the input element and the output element rotates integrally with the sun gear and the other element of the input element and the second element rotates integrally with the carrier that rotatably supports the plurality of pinion gears. The other element is configured to include two plate members that are opposed to each other and coupled with each other by means of a plurality of rivets disposed between the pinion gears. This configuration decreases an average torque to a shaft of the pinion gear. Further, strength (rigidity) of the carrier is ensured by coupling the two plate members with each other by means of the plurality of rivets and deformation of the planetary gear is suppressed such as to improve meshing accuracy of gears. As a result, an energy loss (hysteresis) caused by a gear meshing and the like is decreased.

In the damper device (10) according to the disclosure, the two plate members (111, 112) may be coupled with each other by means of the plurality of rivets (11rm) on an outer side of the sun gear and an inner side of the ring gear. Further, the two plate members (111, 112) may be coupled with each other by means of the plurality of rivets (11rm) disposed on a same circumference as the plurality of pinion gears (23) as viewed in a central axis of the damper device. This configuration enables a radial offset between the pinion shaft and the rivets to be decreased upon a torque transmission, such as to avoid an occurrence of undesired moments. Accordingly, strength (rigidity) of the carrier is ensured and deformation of the planetary gear is suppressed such as to improve meshing accuracy of gears. As a result, an energy loss (hysteresis) caused by a gear meshing and the like is decreased.

In the damper device (10) according to the disclosure, the plurality of rivets are disposed adjacent to any one of the plurality of pinion gears (23) not to contact to the any one of the pinion gears (23). This configuration ensures more strength (rigidity) of the carrier.

In the damper device (10) according to the disclosure, the intermediate element (12) may be arranged to include a first elastic body (SP1) connected to the input element (11) and a second elastic bogy (SP2) connected to the output element (15).

In the damper device, the two plate members (111, 112) may be configured to have an identical shape. This configuration reduces the number of parts.

At least spring constants ($k_1, k_2$) of the first and the second elastic bodies (SP1, SP2) and moments of inertia ($J_2, J_i$) of the intermediate element (12, 12X, 12Y) and the ring gear (25) are determined, based on a minimum frequency ($fa_1$) of frequencies of antiresonance points that provide zero vibration amplitude of the output element (15, 15X, 15Y).

Power from an internal combustion engine (EG) may be transmitted to the input element (11, 11Y). At least the spring constants ($k_1, k_2$) of the first and the second elastic bodies (SP1, SP2) and the moments of inertia ($J_2, J_i$) of the intermediate element (12, 12X, 12Y) and the ring gear (25) are determined, based on the minimum frequency (f a) of the antiresonance point and number (n) of cylinders of the internal combustion engine (EG).

The damper device (10, 10X, 10Y) may be configured to satisfy 500 rpm≤(120/n)·$fa_1$≤1500 rpm, where "$fa_1$" denotes the minimum frequency of the antiresonance point and "n" denotes the number of cylinders of the internal combustion engine (EG).

Setting the antiresonance point that is likely to further decrease the vibration amplitude of the output element in the low rotation speed range of 500 rpm to 1500 rpm allows for coupling of the engine with the input element at the lower rotation speed and further improves the vibration damping effect of the damper device in a low rotation speed range where the vibration from the engine is likely to be increased. Configuration of the damper device such that a minimum frequency of a resonance occurring in the torque transmission path becomes a minimum possible value that is lower than the frequency $fa_1$ of the antiresonance point further reduces the frequency $fa_1$ of the antiresonance point and allows for coupling of the internal combustion engine with the input element at the further lower rotation speed.

The damper device (10, 10X, 10Y) may be configured to satisfy Nlup≤(120/n)·$fa_1$, where "Nlup" denotes a lockup rotation speed of a lockup clutch (8) arranged to couple the internal combustion engine (EG) with the input element (11, 11Y). This enables the vibration from the internal combustion engine to be remarkably effectively damped by the damper device when the internal combustion engine is coupled with the input element by the lockup clutch and immediately after engagement of the lockup.

The damper device (10, 10X, 10) may be configured to satisfy 900 rpm≤(120/n)·$fa_1$≤1200 rpm.

The minimum frequency $fa_1$ of the antiresonance point is expressed by the above Equation (8). When an equation "γ=1/λ·(1+λ)" is satisfied in the Equation (8), the constant γ may be determined according to a connection configuration of rotational elements of the planetary gear with the input element, the intermediate element and the output element and a gear ratio of the planetary gear.

The other element may be the input element (11). A plurality of supporting portions (115, 116) that rotatably support the plurality of pinion gears (23) may be formed in an outer circumference portion of each of the two plate members (111, 112). A first hole (117c, 118c) that supports the pinion gear (23), a plurality of second holes (117b, 117d, 118b, 118d) for fastening by the rivet (11rm), and a plurality of third holes (117a, 117e, 117f, 118a, 118e, 118f) for a tool may be formed in each of the plurality of supporting portions (115, 116) such as to be arranged on a same circumference as the plurality of pinion gears (23) as viewed in a central axis of the damper device. The plurality of second holes (117b, 117d, 118b, 118d) may be aligned with each other and at least portions of the plurality of third holes (117a, 117e, 117f, 118a, 118e, 118f) are aligned with each other when the two plate members (111, 112) are opposed to each other in such a manner that the first holes (117c, 118c) are aligned with each other.

A curved cut-out portion (115g, 116g) may be formed in the each of the plurality of supporting portions (115, 116) such as to avoid the third hole (117f, 118f) located on an end of the plurality of third holes (117a, 117e, 117f, 118a, 118e, 118f) when the two plate members (111, 112) are opposed to each other in such a manner that the first holes (117c, 118c are aligned with each other. Further, at least a portion of the plurality of third holes (117a, 117e, 117f, 118a, 118e, 118f) is used for fastening an engagement element of a lockup clutch. By forming the curved cut-out portion (115g) on the pinion gear supporting portion, the rivet (81r) passing through the through hole (117a) is easily caulked by a tool. By forming the curved cut-out portion (116g) on the pinion gear supporting portion, the rivet (81r) passing through the through hole (117f) is easily caulked by the tool.

The number of the plurality of pinion gears (23) may be three. The number of the plurality of rivets is equal to or more than six.

The disclosure is not limited to the above embodiments in any sense but may be changed, altered or modified in various ways within the scope of extension of the disclosure. Additionally, the embodiments described above are only concrete examples of some aspect of the disclosure described in Summary and are not intended to limit the elements of the disclosure described in Summary.

INDUSTRIAL APPLICABILITY

The techniques according to the disclosure is applicable to, for example, the field of manufacture of the damper device.

The invention claimed is:

1. A damper device configured to include an input element to which a torque from an engine is transmitted, an output element, an intermediate element arranged to be connected to the input element and the output element, the intermediate element including elastic bodies, and a rotary inertia mass damper configured to include a planetary gear that includes a sun gear arranged to rotate integrally with one element of the input element and the output element, a carrier that rotatably supports a plurality of pinion gears, the carrier arranged to rotate integrally with the other element of the input element and the output element, and a ring gear that meshes with the plurality of pinion gears and works as a mass body,
   wherein the other element is configured to include two plate members that are opposed to each other and coupled with each other by means of a plurality of rivets disposed between the pinion gears,
   wherein the two plate members are coupled with each other by means of the plurality of rivets disposed on a same circumference as the plurality of pinion gears as viewed in a central axis of the damper device, and
   wherein the plurality of rivets are disposed adjacent to any one of the plurality of pinion gears not to contact to the any one of the pinion gears.

2. The damper device according to claim 1,
   wherein the two plate members are coupled with each other by means of the plurality of rivets on an outer side of the sun gear and an inner side of the ring gear.

3. The damper device according to claim 1,
   wherein the intermediate element is arranged to include a first elastic body connected to the input element and a second elastic body connected to the output element.

4. The damper device according to claim 1,
   wherein the two plate members are configured to have an identical shape.

5. The damper device according to claim 1,
   wherein at least spring constants of the first and the second elastic bodies and moments of inertia of the intermediate element and the ring gear are determined, based on a minimum frequency of frequencies of antiresonance points that provide zero vibration amplitude of the output element.

6. The damper device according to claim 5,
   wherein power from an internal combustion engine is transmitted to the input element, and
   wherein at least the spring constants of the first and the second elastic bodies and the moments of inertia of the intermediate element and the ring gear are determined, based on the minimum frequency of the antiresonance point and number of cylinders of the internal combustion engine.

7. The damper device according to claim 6,
   wherein the damper device is configured to satisfy 500 rpm (120/n)·$fa_1$≤1500 rpm, where "$fa_1$" denotes the minimum frequency of the antiresonance point and "n" denotes the number of cylinders of the internal combustion engine.

8. The damper device according claim 6,
   wherein the damper device is configured to satisfy Nlup≤(120/n)·$fa_1$, where "Nlup" denotes a lockup rotation speed of a lockup clutch arranged to couple the internal combustion engine with the input element.

9. The damper device according to claim 7,
   wherein the damper device is configured to satisfy 900 rpm≤(120/n)·$fa_1$≤1200 rpm.

10. The damper device according to claim 5,
    wherein the minimum frequency $fa_1$ of the antiresonance point is expressed by Equation (1):

[Math. 1]

$$fa_1 = \frac{1}{2\pi}\sqrt{\frac{(k_1 + k_2) - \sqrt{(k_1 + k_2)^2 - 4\cdot\frac{J_2}{J_i}\cdot\gamma\cdot k_1\cdot k_2}}{2\cdot J_2}} \quad (1)$$

where $k_1$ denotes the spring constant of the first elastic body, $k_2$ denotes the spring constant of the second elastic body, $J_2$ denotes the moment of inertia of the intermediate element, $J_i$ denotes the moment of inertia of the ring gear, and $\gamma$ denotes a constant determined according to a connection configuration of rotational elements of the planetary gear with the input element and the output element, and a gear ratio of the planetary gear.

11. The damper device according to claim 4,
wherein the other element is the input element,
wherein a plurality of supporting portions that rotatably support the plurality of pinion gears are formed in an outer circumference portion of each of the two plate members,
wherein a first hole that supports the pinion gear, a plurality of second holes for fastening by the rivet, and a plurality of third holes for a tool are formed in each of the plurality of supporting portions such as to be arranged on a same circumference as the plurality of pinion gears as viewed in a central axis of the damper device, and
wherein the plurality of second holes are aligned with each other and at least portions of the plurality of third holes are aligned with each other when the two plate members are opposed to each other in such a manner that the first holes are aligned with each other.

12. The damper device according to claim 11,
wherein a curved cut-out portion is formed in the each of the plurality of supporting portions such as to avoid the third hole located on an end of the plurality of third holes when the two plate members are opposed to each other in such a manner that the first holes are aligned with each other.

13. The damper device according to claim 11,
wherein at least a portion of the plurality of third holes is used for fastening an engagement element of a lockup clutch.

14. The damper device according to claim 1,
wherein the number of the plurality of pinion gears is three, and wherein the number of the plurality of rivets is equal to or more than six.

15. A damper device configured to include an input element to which a torque from an engine is transmitted, an output element, an intermediate element arranged to be connected to the input element and the output element, the intermediate element including elastic bodies, and a rotary inertia mass damper configured to have a planetary gear that includes a sun gear arranged to rotate integrally with one element of the input element and the output element, a carrier that rotatably supports a plurality of pinion gears, the carrier arranged to rotate integrally with the other element of the input element and the output element, and a ring gear that meshes with the plurality of pinion gears and works as a mass body,
wherein the other element is configured to include two plate members that are opposed to each other and coupled with each other by means of a plurality of rivets disposed between the pinion gears,
wherein the two plate members are coupled with each other by means of the plurality of rivets on an outer side of the sun gear and an inner side of the ring gear, and
wherein the plurality of rivets are disposed adjacent to any one of the plurality of pinion gears not to contact to the any one of the pinion gears.

16. The damper device according to claim 15,
wherein the intermediate element is arranged to include a first elastic body connected to the input element and a second elastic body connected to the output element.

17. The damper device according to claim 15,
wherein the two plate members are configured to have an identical shape.

* * * * *